US012754164B2

(12) United States Patent
Merriman et al.

(10) Patent No.: US 12,754,164 B2
(45) Date of Patent: Oct. 6, 2026

(54) SINGLE MOLECULE NANOPARTICLE NANOWIRE FOR MOLECULAR ELECTRONIC SENSING

(71) Applicant: Roswell Biotechnologies, Inc., San Diego, CA (US)

(72) Inventors: Barry Merriman, San Diego, CA (US); Sonal Jain, San Diego, CA (US); Drew Kennedy, San Diego, CA (US); Venkatesh Alagarswamy Govindaraj, San Diego, CA (US); Calvin Gardner, San Diego, CA (US); Chulmin Choi, San Diego, CA (US); Namseok Park, San Diego, CA (US); Richard Dubielzig, San Diego, CA (US); Le Zheng, San Diego, CA (US); David Porras, San Diego, CA (US); Paul Pan, San Diego, CA (US)

(73) Assignee: SemiconBio Inc., San Diego, CA (US)

(*) Notice: Subject to any disclaimer, the term of this patent is extended or adjusted under 35 U.S.C. 154(b) by 670 days.

(21) Appl. No.: 17/575,551

(22) Filed: Jan. 13, 2022

(65) Prior Publication Data

US 2022/0252542 A1 Aug. 11, 2022

Related U.S. Application Data

(63) Continuation-in-part of application No. 17/465,804, filed on Sep. 2, 2021.

(Continued)

(51) Int. Cl.

*G01N 27/447* (2006.01)
*B03C 5/00* (2006.01)

(52) U.S. Cl.

CPC ....... *G01N 27/44704* (2013.01); *B03C 5/005* (2013.01); *G01N 27/44791* (2013.01)

(58) Field of Classification Search

CPC ....... G01N 27/44704; G01N 27/44791; G01N 27/48707; G01N 27/48735;

(Continued)

(56) References Cited

U.S. PATENT DOCUMENTS

| | | | |
|---|---|---|---|
| 4,923,586 A | 5/1990 | Katayama et al. | |
| 5,082,627 A | 1/1992 | Stanbro | |

(Continued)

FOREIGN PATENT DOCUMENTS

| | | | |
|---|---|---|---|
| WO | 2020210832 A1 | 10/2020 | |
| WO | 2021226291 A1 | 11/2021 | |

(Continued)

OTHER PUBLICATIONS

Phys.Chem. Chem. Phys., 2011, 13, 9973-99 (Year: 2011).*

*Primary Examiner* — Gurpreet Kaur
(74) *Attorney, Agent, or Firm* — Spectrum IP Law Group LLC

(57) ABSTRACT

The disclosed embodiments relate to nanotechnology and to nano-electronics and molecular electronic sensors. In an exemplary embodiment, a nano-sensor having a nanoparticle complex attached at each end to a respective nano-electrode. An exemplary nanoparticle complex includes a biomolecule coupled at each end to a metallic nanoparticle to form a dumbbell-shaped molecular bridge. A method to manufacture single molecule dumbbell nanowires for forming conductive molecular bridges includes the steps of: providing a double-stranded nucleic acid with terminal 3' thiol modification on both the strands conjugated to a gold (Au) nanoparticle (AuNP) on each end; purifying single biomolecule dumbbells from aggregates using size-exclusion chromatography; imaging the eluted products by electron microscopy to validate formation of single molecule dumbbells; trapping a single molecule dumbbell between a pair of nanoelectrodes on a substrate, the electrodes sepa- (Continued)

rated by a nanogap; and measuring the conductivity of a trapped single molecule dumbbell.

20 Claims, 35 Drawing Sheets

Specification includes a Sequence Listing.

Related U.S. Application Data

(60) Provisional application No. 63/137,492, filed on Jan. 14, 2021, provisional application No. 63/073,625, filed on Sep. 2, 2020.

(58) Field of Classification Search
CPC ........ G01N 33/48721; G01N 33/48728; Y10S 977/852; Y10S 977/733; Y10S 977/72; Y10S 977/721; B03C 5/005; B03C 5/026; B03C 2201/26
See application file for complete search history.

(56) References Cited

U.S. PATENT DOCUMENTS

| | | | |
|---|---|---|---|
| 5,194,133 | A | 3/1993 | Clark et al. |
| 5,366,140 | A | 11/1994 | Koskenmaki et al. |
| 5,414,588 | A | 5/1995 | Barbee, Jr. et al. |
| 5,486,449 | A | 1/1996 | Hosono et al. |
| 5,532,128 | A | 7/1996 | Eggers et al. |
| 5,583,359 | A | 12/1996 | Ng et al. |
| 5,639,507 | A | 6/1997 | Galvagni |
| 5,646,420 | A | 7/1997 | Yamashita |
| 5,767,687 | A | 6/1998 | Geist |
| 5,871,918 | A | 2/1999 | Thorp et al. |
| 5,881,184 | A | 3/1999 | Guidash |
| 5,965,452 | A | 10/1999 | Kovacs |
| 5,982,018 | A | 11/1999 | Wark et al. |
| 6,051,380 | A | 4/2000 | Sosnowski et al. |
| 6,060,023 | A | 5/2000 | Maracas |
| 6,094,335 | A | 7/2000 | Early |
| 6,110,354 | A | 8/2000 | Saban et al. |
| 6,123,819 | A | 9/2000 | Peeters |
| 6,144,023 | A | 11/2000 | Clerc |
| 6,238,927 | B1 | 5/2001 | Abrams et al. |
| 6,440,662 | B1 | 8/2002 | Gerwen et al. |
| 6,464,889 | B1 | 10/2002 | Lee et al. |
| 6,506,564 | B1 | 1/2003 | Mirkin et al. |
| 6,537,747 | B1 | 3/2003 | Mills, Jr. et al. |
| 6,670,131 | B2 | 12/2003 | Hashimoto |
| 6,673,533 | B1 | 1/2004 | Wohlstadter et al. |
| 6,716,620 | B2 | 4/2004 | Bashir et al. |
| 6,749,731 | B2 | 6/2004 | Kobori et al. |
| 6,762,050 | B2 | 7/2004 | Fukushima et al. |
| 6,764,745 | B1 | 7/2004 | Karasawa et al. |
| 6,790,341 | B1 | 9/2004 | Saban et al. |
| 6,824,974 | B2 | 11/2004 | Pisharody et al. |
| 6,861,224 | B2 | 3/2005 | Fujita et al. |
| 6,916,614 | B1 | 7/2005 | Takenaka et al. |
| 6,958,216 | B2 | 10/2005 | Kelley et al. |
| 7,015,046 | B2 | 3/2006 | Wohlstadter et al. |
| 7,075,428 | B1 | 7/2006 | Oleynik |
| 7,169,272 | B2 | 1/2007 | Fritsch et al. |
| 7,183,055 | B2 | 2/2007 | Weide et al. |
| 7,189,435 | B2 | 3/2007 | Tuominen et al. |
| 7,202,480 | B2 | 4/2007 | Yokoi et al. |
| 7,208,077 | B1 | 4/2007 | Albers et al. |
| 7,276,206 | B2 | 10/2007 | Augustine et al. |
| 7,399,585 | B2 | 7/2008 | Gau |
| 7,432,120 | B2 | 10/2008 | Mascolo et al. |
| 7,470,533 | B2 | 12/2008 | Xu et al. |
| 7,507,320 | B2 | 3/2009 | Hwang et al. |
| 7,531,120 | B2 | 5/2009 | Rijn et al. |
| 7,579,823 | B1 | 8/2009 | Ayliffe |
| 7,691,433 | B2 | 4/2010 | Kronholz et al. |
| 7,785,785 | B2 | 8/2010 | Pourmand et al. |
| 7,834,344 | B2 | 11/2010 | Mascolo et al. |
| 7,851,045 | B2 | 12/2010 | Gandon et al. |
| 7,886,601 | B2 | 2/2011 | Merassi et al. |
| 7,901,629 | B2 | 3/2011 | Calatzis et al. |
| 7,943,394 | B2 | 5/2011 | Flandre et al. |
| 8,241,508 | B2 | 8/2012 | D'Urso et al. |
| 8,313,633 | B2 | 11/2012 | Li et al. |
| 8,351,181 | B1 | 1/2013 | Ahn et al. |
| 8,591,816 | B2 | 11/2013 | Calatzis et al. |
| 8,652,768 | B1 | 2/2014 | Huber et al. |
| 8,753,893 | B2 | 6/2014 | Liu et al. |
| 8,927,464 | B2 | 1/2015 | Aizenberg et al. |
| 8,940,663 | B2 | 1/2015 | Iqbal et al. |
| 9,070,733 | B2 | 6/2015 | Rajagopal et al. |
| 9,108,880 | B2 | 8/2015 | Jin et al. |
| 9,139,614 | B2 | 9/2015 | Medintz et al. |
| 9,306,164 | B1 | 4/2016 | Chang et al. |
| 9,829,456 | B1 | 11/2017 | Jin et al. |
| 9,956,743 | B2 | 5/2018 | Jin et al. |
| 10,036,064 | B2 | 7/2018 | Merriman et al. |
| 10,125,420 | B2 | 11/2018 | Jin et al. |
| 10,151,722 | B2 | 12/2018 | Jin et al. |
| 10,508,296 | B2 | 12/2019 | Merriman et al. |
| 10,526,696 | B2 | 1/2020 | Jin et al. |
| 10,584,410 | B2 | 3/2020 | Jin et al. |
| 10,597,767 | B2 | 3/2020 | Merriman et al. |
| 10,648,941 | B2 | 5/2020 | Merriman et al. |
| 10,712,334 | B2 | 7/2020 | Choi et al. |
| 2002/0022223 | A1 | 2/2002 | Connolly |
| 2002/0090649 | A1 | 7/2002 | Chan et al. |
| 2002/0137083 | A1 | 9/2002 | Kobori et al. |
| 2002/0138049 | A1 | 9/2002 | Allen et al. |
| 2002/0142150 | A1 | 10/2002 | Baumann et al. |
| 2002/0142477 | A1 | 10/2002 | Lewis et al. |
| 2002/0172963 | A1 | 11/2002 | Kelley et al. |
| 2002/0184939 | A1 | 12/2002 | Yadav et al. |
| 2003/0025133 | A1 | 2/2003 | Brousseau |
| 2003/0040173 | A1 | 2/2003 | Fonash et al. |
| 2003/0064390 | A1 | 4/2003 | Schülein et al. |
| 2003/0087296 | A1 | 5/2003 | Fujita et al. |
| 2003/0109031 | A1 | 6/2003 | Chafin et al. |
| 2003/0141189 | A1 | 7/2003 | Lee et al. |
| 2003/0141276 | A1 | 7/2003 | Lee |
| 2003/0186263 | A1 | 10/2003 | Frey et al. |
| 2003/0224387 | A1 | 12/2003 | Kunwar et al. |
| 2004/0012161 | A1 | 1/2004 | Chiu |
| 2004/0014106 | A1 | 1/2004 | Patno et al. |
| 2004/0023253 | A1 | 2/2004 | Kunwar et al. |
| 2004/0038090 | A1 | 2/2004 | Faris |
| 2004/0048241 | A1 | 3/2004 | Freeman et al. |
| 2004/0063100 | A1 | 4/2004 | Wang |
| 2004/0086929 | A1 | 5/2004 | Weide et al. |
| 2004/0096866 | A1 | 5/2004 | Hofmann et al. |
| 2004/0146863 | A1 | 7/2004 | Pisharody et al. |
| 2004/0209355 | A1 | 10/2004 | Edman et al. |
| 2004/0209435 | A1 | 10/2004 | Partridge et al. |
| 2004/0229247 | A1 | 11/2004 | DeBoer et al. |
| 2004/0235016 | A1 | 11/2004 | Hamers et al. |
| 2004/0248282 | A1 | 12/2004 | M. et al. |
| 2005/0029227 | A1 | 2/2005 | Chapman |
| 2005/0067086 | A1 | 3/2005 | Ito et al. |
| 2005/0074911 | A1 | 4/2005 | Kornilovich et al. |
| 2005/0151541 | A1 | 7/2005 | Brinz et al. |
| 2005/0156157 | A1 | 7/2005 | Parsons et al. |
| 2005/0164371 | A1 | 7/2005 | Arinaga |
| 2005/0172199 | A1 | 8/2005 | Miller et al. |
| 2005/0181195 | A1 | 8/2005 | Dubrow |
| 2005/0221473 | A1 | 10/2005 | Dubin et al. |
| 2005/0227373 | A1 | 10/2005 | Flandre et al. |
| 2005/0247573 | A1 | 11/2005 | Nakamura et al. |
| 2005/0285275 | A1 | 12/2005 | Son et al. |
| 2005/0287548 | A1 | 12/2005 | Bao et al. |
| 2005/0287589 | A1 | 12/2005 | Connolly |
| 2006/0003482 | A1 | 1/2006 | Chinthakindi et al. |
| 2006/0019273 | A1 | 1/2006 | Connolly et al. |
| 2006/0024504 | A1 | 2/2006 | Nelson et al. |
| 2006/0024508 | A1 | 2/2006 | D'Urso et al. |
| 2006/0029808 | A1 | 2/2006 | Zhai et al. |
| 2006/0051919 | A1 | 3/2006 | Mascolo et al. |

(56) References Cited

U.S. PATENT DOCUMENTS

| | | | |
|---|---|---|---|
| 2006/0051946 | A1 | 3/2006 | Mascolo et al. |
| 2006/0105449 | A1 | 5/2006 | Larmer et al. |
| 2006/0105467 | A1 | 5/2006 | Niksa et al. |
| 2006/0128239 | A1 | 6/2006 | Nun et al. |
| 2006/0147983 | A1 | 7/2006 | O'Uchi |
| 2006/0154489 | A1 | 7/2006 | Tornow et al. |
| 2006/0275853 | A1 | 12/2006 | Mathew et al. |
| 2007/0026193 | A1 | 2/2007 | Luzinov et al. |
| 2007/0048748 | A1 | 3/2007 | Williams et al. |
| 2007/0140902 | A1 | 6/2007 | Calatzis et al. |
| 2007/0148815 | A1 | 6/2007 | Chao et al. |
| 2007/0184247 | A1 | 8/2007 | Simpson et al. |
| 2007/0186628 | A1 | 8/2007 | Curry et al. |
| 2007/0207487 | A1 | 9/2007 | Emig et al. |
| 2007/0231542 | A1 | 10/2007 | Deng et al. |
| 2008/0012007 | A1 | 1/2008 | Li et al. |
| 2008/0098815 | A1 | 5/2008 | Merassi et al. |
| 2008/0149479 | A1 | 6/2008 | Olofsson et al. |
| 2008/0199657 | A1 | 8/2008 | Capron et al. |
| 2008/0199659 | A1 | 8/2008 | Zhao |
| 2009/0006284 | A1 | 1/2009 | Liu et al. |
| 2009/0011222 | A1 | 1/2009 | Xiu et al. |
| 2009/0017571 | A1 | 1/2009 | Nuckolls et al. |
| 2009/0020428 | A1 | 1/2009 | Levitan et al. |
| 2009/0027036 | A1 | 1/2009 | Nuckolls et al. |
| 2009/0152109 | A1 | 6/2009 | Whitehead et al. |
| 2009/0162927 | A1 | 6/2009 | Naaman et al. |
| 2009/0170716 | A1 | 7/2009 | Su et al. |
| 2009/0178935 | A1 | 7/2009 | Reymond et al. |
| 2009/0295372 | A1 | 12/2009 | Krstic et al. |
| 2009/0297913 | A1 | 12/2009 | Zhang et al. |
| 2009/0306578 | A1 | 12/2009 | Sivan et al. |
| 2009/0324308 | A1 | 12/2009 | Law et al. |
| 2010/0038342 | A1 | 2/2010 | Lim et al. |
| 2010/0044212 | A1 | 2/2010 | Kim et al. |
| 2010/0055397 | A1 | 3/2010 | Kurihara et al. |
| 2010/0132771 | A1 | 6/2010 | Lu |
| 2010/0142259 | A1 | 6/2010 | Drndic et al. |
| 2010/0149530 | A1 | 6/2010 | Tomaru |
| 2010/0167938 | A1 | 7/2010 | Su et al. |
| 2010/0184062 | A1 | 7/2010 | Steinmüller-Nethl et al. |
| 2010/0188109 | A1 | 7/2010 | Edel et al. |
| 2010/0194409 | A1 | 8/2010 | Gao et al. |
| 2010/0201381 | A1 | 8/2010 | Iqbal et al. |
| 2010/0206367 | A1 | 8/2010 | Jeong et al. |
| 2010/0227416 | A1 | 9/2010 | Koh et al. |
| 2010/0280397 | A1 | 11/2010 | Feldman et al. |
| 2010/0285275 | A1 | 11/2010 | Baca et al. |
| 2010/0285601 | A1 | 11/2010 | Kong et al. |
| 2010/0288543 | A1 | 11/2010 | Hung et al. |
| 2010/0300899 | A1 | 12/2010 | Levine et al. |
| 2011/0056845 | A1 | 3/2011 | Stellacci et al. |
| 2011/0065588 | A1 | 3/2011 | Su et al. |
| 2011/0076783 | A1 | 3/2011 | Liu et al. |
| 2011/0091787 | A1 | 4/2011 | McGrath et al. |
| 2011/0160077 | A1 | 6/2011 | Chaisson et al. |
| 2011/0166034 | A1 | 7/2011 | Kwong et al. |
| 2011/0217763 | A1 | 9/2011 | Rasooly et al. |
| 2011/0227558 | A1 | 9/2011 | Mannion et al. |
| 2011/0229667 | A1 | 9/2011 | Jin et al. |
| 2011/0233075 | A1 | 9/2011 | Soleymani et al. |
| 2011/0248315 | A1 | 10/2011 | Nam et al. |
| 2011/0287956 | A1 | 11/2011 | Iqbal et al. |
| 2011/0291673 | A1 | 12/2011 | Shibata et al. |
| 2011/0311853 | A1 | 12/2011 | Fratti |
| 2011/0312529 | A1 | 12/2011 | He et al. |
| 2012/0060905 | A1 | 3/2012 | Fogel et al. |
| 2012/0122715 | A1 | 5/2012 | Gao et al. |
| 2012/0220046 | A1 | 8/2012 | Chao |
| 2012/0258870 | A1 | 10/2012 | Schwartz et al. |
| 2012/0286332 | A1 | 11/2012 | Rothberg et al. |
| 2012/0309106 | A1 | 12/2012 | Eichen et al. |
| 2013/0049158 | A1 | 2/2013 | Hong et al. |
| 2013/0071289 | A1 | 3/2013 | Knoll |
| 2013/0108956 | A1 | 5/2013 | Lu et al. |
| 2013/0109577 | A1 | 5/2013 | Korlach et al. |
| 2013/0162276 | A1 | 6/2013 | Lee et al. |
| 2013/0183492 | A1 | 7/2013 | Lee et al. |
| 2013/0214875 | A1 | 8/2013 | Duncan et al. |
| 2013/0239349 | A1 | 9/2013 | Knights et al. |
| 2013/0245416 | A1 | 9/2013 | Yarmush et al. |
| 2013/0273340 | A1 | 10/2013 | Neretina et al. |
| 2013/0281325 | A1 | 10/2013 | Elibol et al. |
| 2013/0331299 | A1 | 12/2013 | Reda et al. |
| 2014/0001055 | A1 | 1/2014 | Elibol et al. |
| 2014/0011013 | A1 | 1/2014 | Jin et al. |
| 2014/0018262 | A1 | 1/2014 | Reda et al. |
| 2014/0027775 | A1 | 1/2014 | Quick et al. |
| 2014/0048776 | A1 | 2/2014 | Huang et al. |
| 2014/0054788 | A1 | 2/2014 | Majima et al. |
| 2014/0057283 | A1 | 2/2014 | Wang et al. |
| 2014/0061049 | A1 | 3/2014 | Lo et al. |
| 2014/0079592 | A1 | 3/2014 | Chang et al. |
| 2014/0170567 | A1 | 6/2014 | Sakamoto et al. |
| 2014/0174927 | A1 | 6/2014 | Bashir et al. |
| 2014/0197459 | A1 | 7/2014 | Kis et al. |
| 2014/0218637 | A1 | 8/2014 | Gao et al. |
| 2014/0235493 | A1 | 8/2014 | Zang et al. |
| 2014/0253827 | A1 | 9/2014 | Gao et al. |
| 2014/0284667 | A1 | 9/2014 | Basker et al. |
| 2014/0320849 | A1 | 10/2014 | Chou et al. |
| 2014/0367749 | A1 | 12/2014 | Bai et al. |
| 2014/0377900 | A1 | 12/2014 | Astier et al. |
| 2015/0005188 | A1 | 1/2015 | Levner et al. |
| 2015/0017655 | A1 | 1/2015 | Huang et al. |
| 2015/0049332 | A1 | 2/2015 | Sun et al. |
| 2015/0057182 | A1 | 2/2015 | Merriman et al. |
| 2015/0065353 | A1 | 3/2015 | Turner et al. |
| 2015/0068892 | A1 | 3/2015 | Ueno et al. |
| 2015/0077183 | A1 | 3/2015 | Ciubotaru |
| 2015/0148264 | A1 | 5/2015 | Esfandyarpour et al. |
| 2015/0177150 | A1 | 6/2015 | Rothberg et al. |
| 2015/0191709 | A1 | 7/2015 | Heron et al. |
| 2015/0263203 | A1 | 9/2015 | Lewis et al. |
| 2015/0294875 | A1 | 10/2015 | Khondaker et al. |
| 2015/0344945 | A1 | 12/2015 | Mandell et al. |
| 2016/0017416 | A1 | 1/2016 | Boyanov et al. |
| 2016/0155971 | A1 | 6/2016 | Strachan et al. |
| 2016/0187282 | A1 | 6/2016 | Gardner et al. |
| 2016/0265047 | A1 | 9/2016 | Rooyen et al. |
| 2016/0284811 | A1 | 9/2016 | Yu et al. |
| 2016/0290957 | A1 | 10/2016 | Ram et al. |
| 2016/0319342 | A1 | 11/2016 | Kawai et al. |
| 2016/0377564 | A1 | 12/2016 | Carmignani et al. |
| 2017/0023512 | A1 | 1/2017 | Cummins et al. |
| 2017/0037462 | A1 | 2/2017 | Turner et al. |
| 2017/0038333 | A1 | 2/2017 | Turner et al. |
| 2017/0043355 | A1 | 2/2017 | Fischer |
| 2017/0044605 | A1 | 2/2017 | Merriman et al. |
| 2017/0131237 | A1 | 5/2017 | Ikeda |
| 2017/0184542 | A1 | 6/2017 | Chatelier et al. |
| 2017/0234825 | A1 | 8/2017 | Elibol et al. |
| 2017/0240962 | A1 | 8/2017 | Merriman et al. |
| 2017/0288017 | A1 | 10/2017 | Majima et al. |
| 2017/0332918 | A1 | 11/2017 | Keane |
| 2018/0014786 | A1 | 1/2018 | Keane |
| 2018/0031508 | A1 | 2/2018 | Jin et al. |
| 2018/0031509 | A1 | 2/2018 | Jin et al. |
| 2018/0045665 | A1 | 2/2018 | Jin et al. |
| 2018/0297321 | A1 | 10/2018 | Jin et al. |
| 2018/0305727 | A1 | 10/2018 | Merriman et al. |
| 2018/0340220 | A1 | 11/2018 | Merriman et al. |
| 2019/0004003 | A1 | 1/2019 | Merriman et al. |
| 2019/0033244 | A1 | 1/2019 | Jin et al. |
| 2019/0039065 | A1* | 2/2019 | Choi ........................ C12Q 1/00 |
| 2019/0041355 | A1 | 2/2019 | Merriman et al. |
| 2019/0041378 | A1* | 2/2019 | Choi .................. G01N 27/3278 |
| 2019/0094175 | A1 | 3/2019 | Merriman et al. |
| 2019/0194801 | A1 | 6/2019 | Jin et al. |
| 2019/0355442 | A1 | 11/2019 | Merriman et al. |
| 2019/0376925 | A1 | 12/2019 | Choi et al. |
| 2019/0383770 | A1 | 12/2019 | Choi et al. |
| 2020/0157595 | A1 | 5/2020 | Merriman et al. |
| 2020/0217813 | A1 | 7/2020 | Merriman et al. |

(56) References Cited

U.S. PATENT DOCUMENTS

| | | | |
|---|---|---|---|
| 2020/0242482 | A1 | 7/2020 | Merriman et al. |
| 2020/0277645 | A1 | 9/2020 | Merriman et al. |
| 2020/0385850 | A1 | 12/2020 | Merriman et al. |
| 2020/0385855 | A1 | 12/2020 | Jin et al. |
| 2020/0393440 | A1 | 12/2020 | Jin et al. |

FOREIGN PATENT DOCUMENTS

| | | | |
|---|---|---|---|
| WO | 2021237180 | A1 | 11/2021 |
| WO | 2021237182 | A1 | 11/2021 |
| WO | 2021262739 | A1 | 12/2021 |
| WO | 2022051558 | A1 | 3/2022 |

* cited by examiner

Purification of single molecule species using SEC column
Load sample in HPLC vial and pass through an SEC column
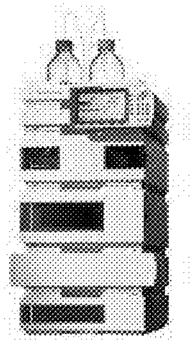
Column specifications:
1000 Å, 7.8x300mm
Purification buffer:
2mM Sodium Citrate + 5mM SDS
Collect desired species
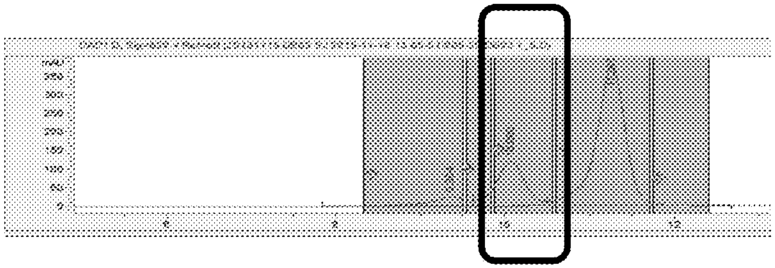
*Fig. 1B*

SEM/TEM verification

Spot 4-5 µl of the collected fraction onto a metal thin film and allow to bind for 10 minutes. Blow dry with $N_2$ gas and image.

| Oligonucleotide | Sequence (5' to 3') |
|---|---|
| 15 nm thiolated forward | GCGTGCTCACCTCTGCCCGCCGGAGCCTGCGCGACTGGGTCGAGGCC/3ThioMC3-D/ |
| 15 nm thiolated reverse | GGCCTCGACCCAGTCGCGCAGGCTCCGGCGGGCAGAGGTGAGCACGC/3ThioMC3-D/ |
| 25 nm thiolated forward | CCG GTC GAG CTC CGG TGT GCC CGA CGC CTG TCC GCX CCC AGC TGC CGC GCA GAG TGC GCC AGC TCG CAG GCC GAG CCC TCC CGG C/3ThioMC3-D/ |
| 25 nm thiolated reverse | GCC GGG AGG GCT CGG CCT GCG AGC TGG CGC ACT CTG CGC GGC AGC TGG GAG CGG ACA GGC GTC GGG CAC ACC GGA GCT CGA CCG G/3ThioMC3-D/ |
| 25 nm dual-thiolated forward | /5ThioMC6-D/CCG GTC GAG CTC CGG TGT GCC CGA CGC CTG TCC GCX CCC AGC TGC CGC GCA GAG TGC GCC AGC TCG CAG GCC GAG CCC TCC CGG C/3ThioMC3-D/ |
| 25 nm dual-thiolated reverse | /5ThioMC6-D/ GCC GGG AGG GCT CGG CCT GCG AGC TGG CGC ACT CTG CGC GGC AGC TGG GAG CGG ACA GGC GTC GGG CAC ACC GGA GCT CGA CCG G/3ThioMC3-D/ |
| 25 nm dual-thiolated with alkyne forward | /5ThioMC6-D/CCG GTC GAG CTC CGG TGT GCC CGA CGC CTG TCC GC**X(modified T)**CCC AGC TGC CGC GCA GAG TGC GCC AGC TCG CAG GCC GAG CCC TCC CGG C/3ThioMC3-D/ |
| 15 nm non-thiolated forward | 5' GCGTGCTCACCTCTGCCCGCCGGAGCCTGCGCGACTGGGTCGAGGCC 3' |
| 15 nm non-thiolated reverse | 5' GGCCTCGACCCAGTCGCGCAGGCTCCGGCGGGCAGAGGTGAGCACGC 3' |

*Fig. 3*

| | AuNP:DNA | dsDNA [stock] nM | AuNP [stock] nM | AuNP [reaction] nM | DNA [reaction] nM | Total (µl) | DNA reaction (µl) | AuNP reaction (µl) | Conjugation Buffer (µl) | Buffer Dilution Factor |
|---|---|---|---|---|---|---|---|---|---|---|
| 15nm thiol DNA | 5 | 1000 | 158 | 100 | 20 | **100** | **2** | **63.1** | **34.9** | 2.9 |
| 15nm control DNA | 5 | 1000 | 158 | 100 | 20 | **100** | **2** | **63.1** | **34.9** | 2.9 |

*Fig. 5*

10nm BSPP passivated AuNPs
(A)

15 nm thiolated DNA
(B)

Control reaction non-thiolated DNA-AuNP
(C)

Voltage Driven Self-Assembly

Pre-bound Biomolecular Bridges to Nano-particles for delivery to electrodes

- Benefits: *Ultrafast* (1 second), *ultra-efficient* (90%+) self-assembly of bridge into nano-electrodes, also allows easier to nano-fabricate (larger) electrode gaps
- Method:
  - ✓ AC-Voltage driven ("dielectrophoretic") trapping of bridge-Gold Nanoparticle 'dumbbells' constructs
  - ✓ Range of electrode gaps can be larger: 20-50 nm
  - ✓ Range of gold particle sizes (5-50nm)

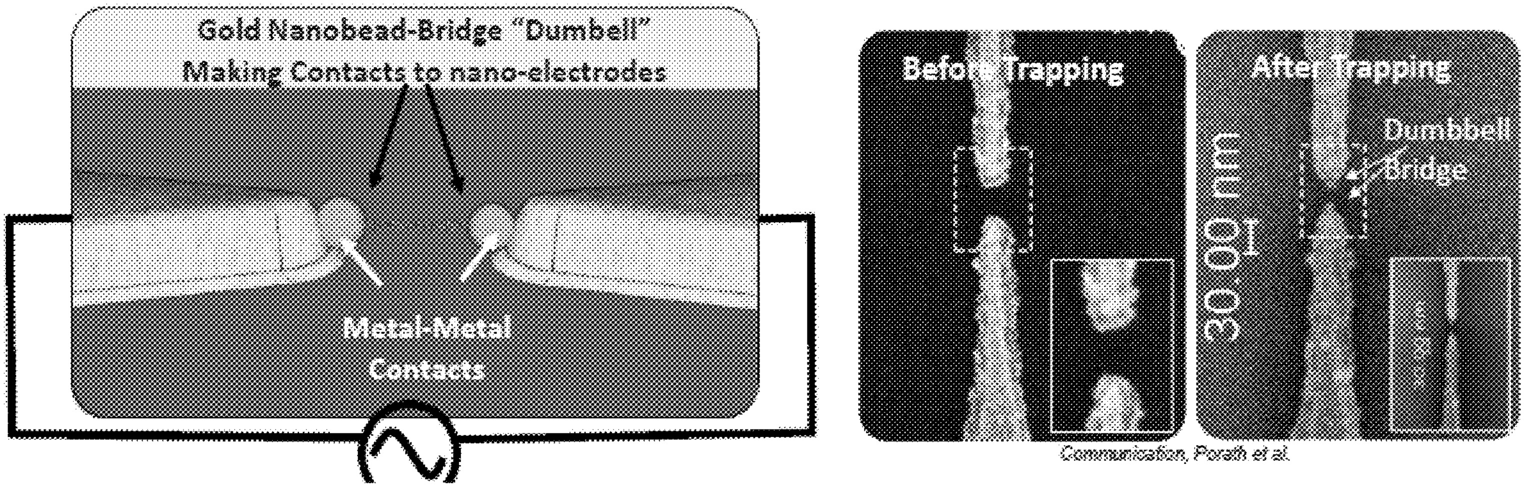

Communication, Porath et al.

Fig. 15

Dielectrophoretic driven trapping of AU nanoparticles
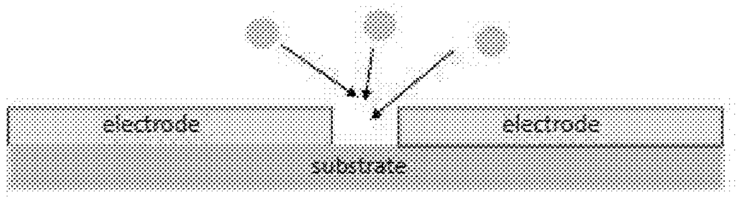
Expt Conditions:
Gold beads (20nm) were added to R&D chip (W46-128, Pd nanoelectrodes)
AC frequency was applied for 5 min at 7 $V_{p\text{-}p}$ amplitude
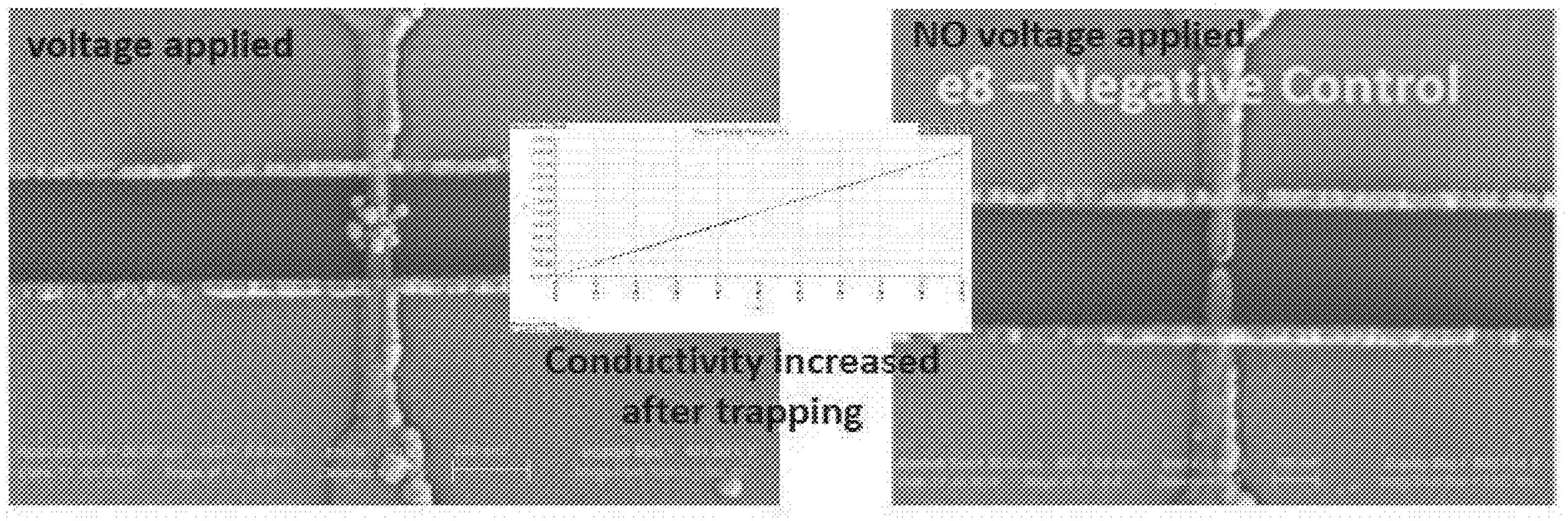
*Fig. 17*

Example: Active trapping of AuNP-DNA "Dumbbell" complexes
- *Current setup, typically expect to trap >>1 molecule*
- Biased towards higher-order complexes (> single DNA-AuNP dumbbell)
- Many AuNP-DNA are stacked in z-dimension
- Beads distal to electrodes appear part of higher-order trapped complexes
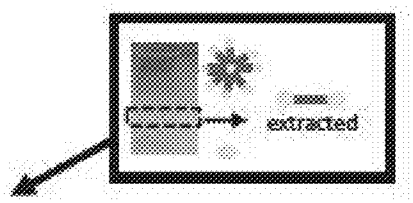
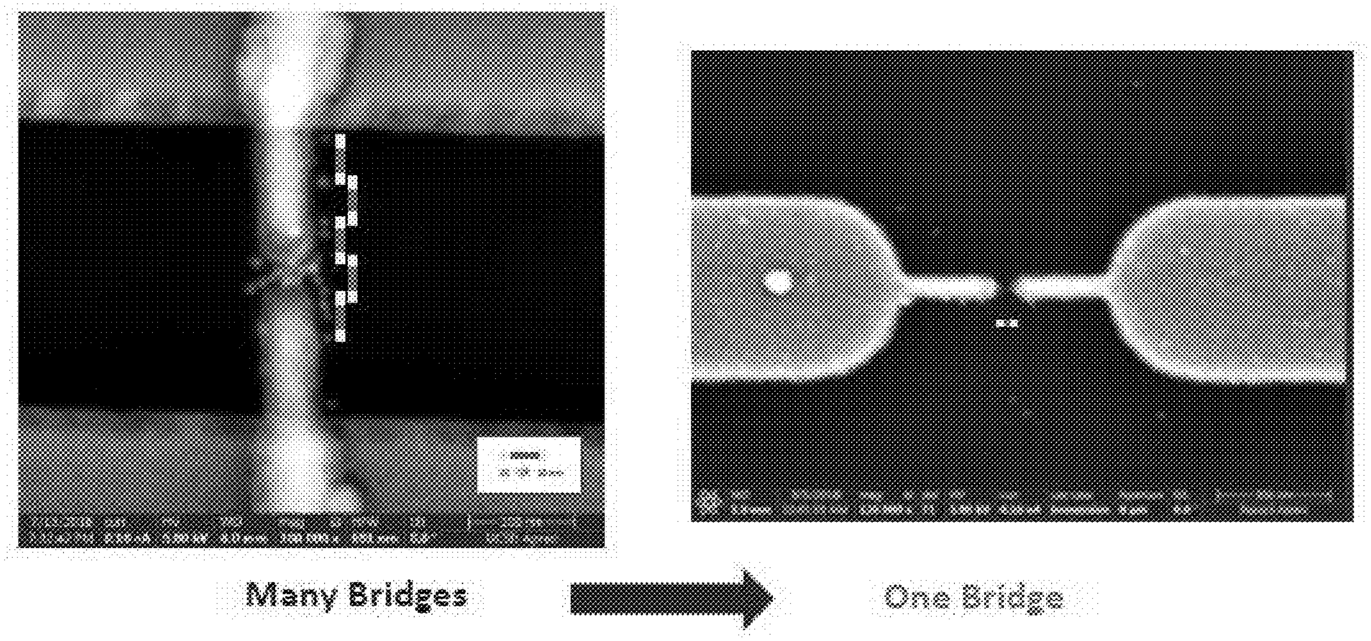
*Fig. 25*

This Can Be done on CMOS Chips with modified pixel electronics
Approach 1: sine wave generation on chip with directly digital synthesis DAC
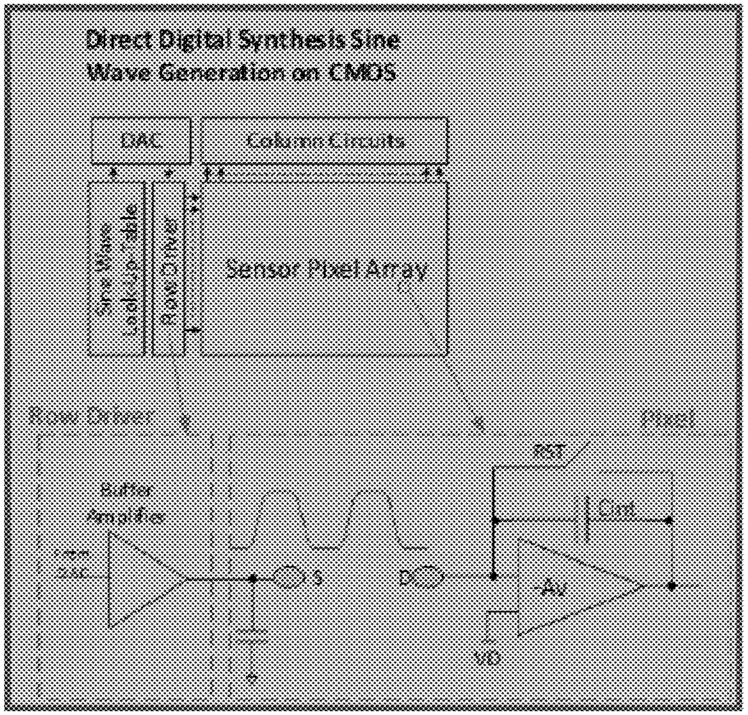
Approach 2: Approximate sine wave generation on chip with analog charge pump (rounded square wave)
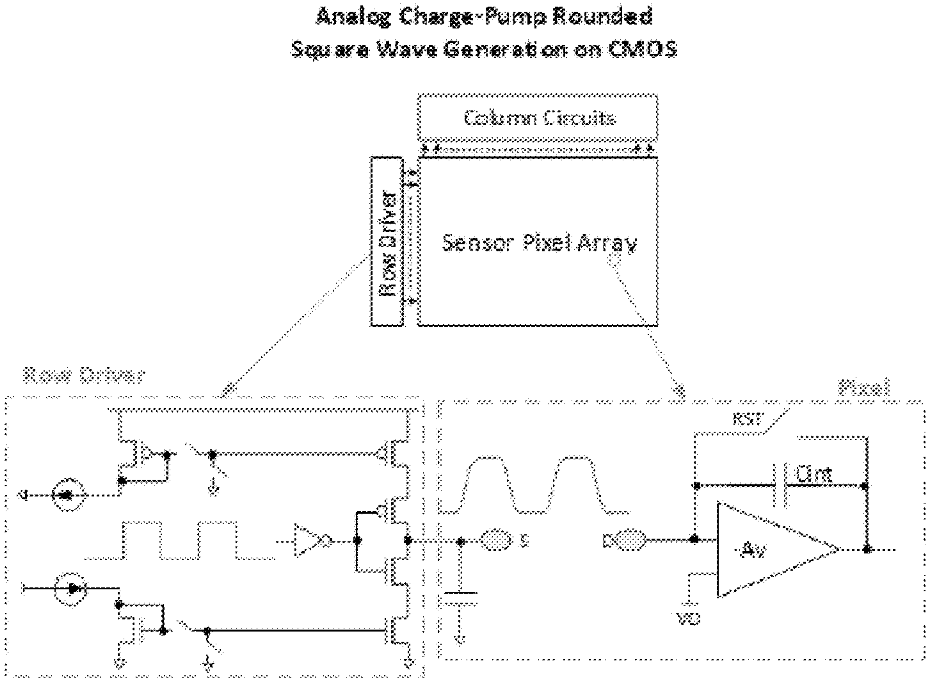
*Fig. 26*

Dumbbell Bridge Concept

Key advantages:

1. Enables visualization of bridge / knowing there is exactly 1 bridge

2. Requires one-time optimization of bridging parameters for different bridges (peptide, DNA)

3. Allows for flexibility in nanoelectrode gap size

Active Trapping of 10-25-10 Dumbbell @ <1nM on Probe Station

| Condition | Frequency | Voltage | Signal Duration |
|---|---|---|---|
| 1 | 10Mhz | 2.5Vpp | 1 min |
| 2 | 10Mhz | 2.5Vpp | 2 min |
| 3 | 10Mhz | 2.5Vpp | 3 min |
| 4 | 10Mhz | 2.5Vpp | 5 min |
| 5 | 10Mhz | 5Vpp | 2min |
| 6 | 10Mhz | 7Vpp | 2min |
| 7 | 10Mhz | [illegible] | 1 min |

8CAB max conditions

Shown below

Electrodes damaged!

Active Trapping of 10-25-10 Dumbbell @ <1nM on 8CAB

Bridging conditions: 10Mhz | 2.5Vpp | 10 min

WiZyme-Dumbbell Using Double-Crossover Derived DNA Molecules (DDDM)

Advantages of using DDDM:

i) Conductive[1,2],
ii) Rigidity,
iii) Precise Length Control, and
iv) Diverse Modifications at different positions.

1. Wang, K. *J. Functional Materials* 9, 8-38 (2018).
2. Slinker, J.D. *et al.*, *Nat. Chem.* 3, 230-235 (2011).

SINGLE MOLECULE NANOPARTICLE NANOWIRE FOR MOLECULAR ELECTRONIC SENSING

The disclosure claims priority to the U.S. Provisional Patent Application Ser. No. 63/137,492, filed Jan. 14, 2021, by Gardner C., et al. entitled 'Dielectrophoretic Trapping of Biomolecules in Molecular Sensors', and is a continuation-in-part of U.S. patent application Ser. No. 17/465,804 filed Sep. 2, 2021, by Barry Merriman et al., entitled 'Single Molecule Nanoparticle Nanowire For Molecular Electronic Sensing', the specifications of which are incorporated herein in their entirety.

The instant application contains a Sequence Listing which has been submitted electronically in ASCII format and is hereby incorporated by reference in its entirety. Said ASCII copy, created on Apr. 18, 2022, is named ROS-0300-CIP SL.txt and is 3,384 bytes in size.

FIELD

The instant disclosure relates to sensors. More specifically, the disclosure relates to nanotechnology and nanoelectronics and molecular electronic sensors.

BACKGROUND

The field of molecular electronics concerns placing single molecules into circuits, to act as functional circuit elements. There have been a variety of molecules that have been used as molecular wires in nano-circuits, such as carbon nanotubes or double-stranded DNA molecules or alpha-helical proteins. There have also been a variety of methods used to assemble these molecular wires into circuits, such as passive diffusion or voltage driven approaches such as electrophoresis. Relevant examples of such are described in these references.

BRIEF DESCRIPTION OF THE DRAWINGS

The following exemplary and non-limiting drawings are provided to illustrates the disclosed principles, in which:

FIG. 1B illustrates an exemplary method for purifying (filtering) a single molecule dumbbell complex according to one embodiment of the disclosure.

FIG. 3 provides exemplary DNA sequences used for nanoparticle nanowire construction and discloses SEQ ID NOS 1-9, respectively, in order of appearance;

FIG. 5 describes a calculation for conjugating a double-stranded thiolated oligonucleotide with AuNPs;

FIG. 15 shows the active bridging by trapping AuNP-DNA dumbells. The left panel shows active bridging using 10 nM AuNP and 25 nM DNA for ten seconds and the right panel shows active bridging using 10 nM AuNP and 25 nM DNA for one second;

FIG. 17 shows a cross section view (3_53 v) of a nanoelectrode field simulation with a color coded density plot;

DETAILED DESCRIPTION

Figure 1A:
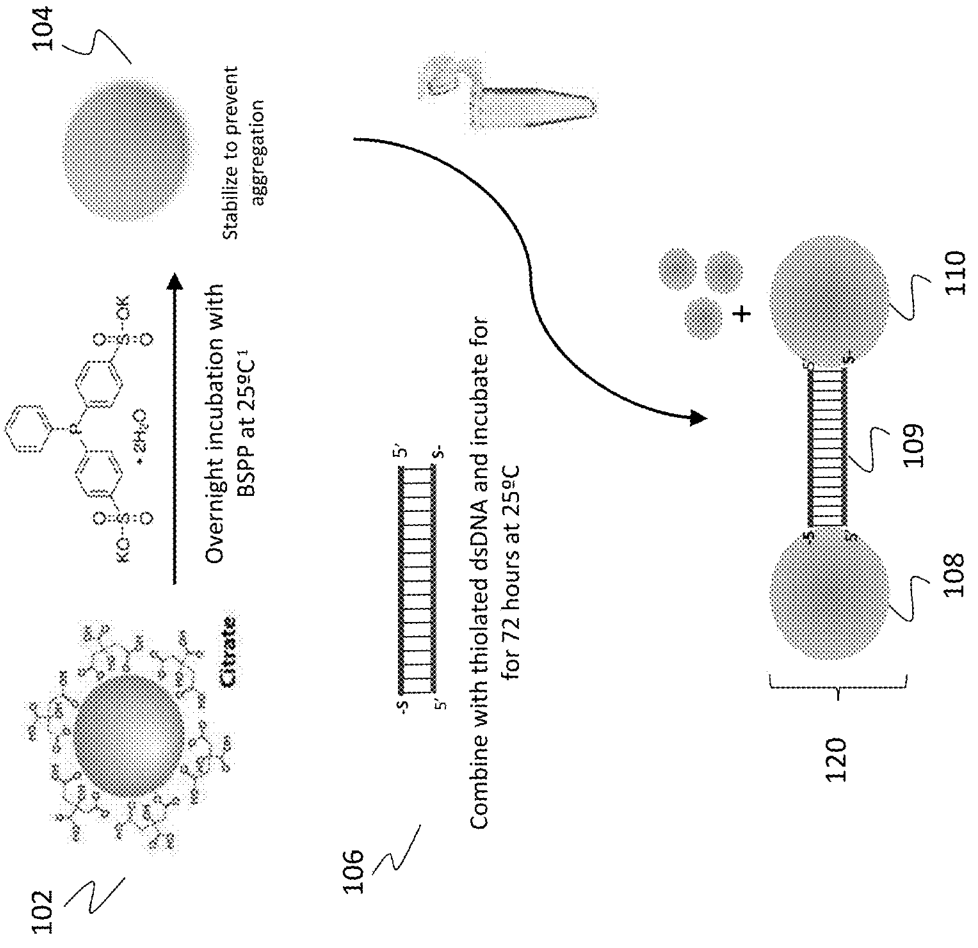
FIG. 1A illustrates an exemplary method for fabricating a single molecule dumbbell complex.

The following terminology is provided in illustrating the disclosed embodiments. The terminology is illustrative and non-limiting. To the extent used herein, "complementarity" refers to the ability of a nucleic acid to form hydrogen bond(s) or hybridize with another nucleic acid sequence by either traditional Watson-Crick or other non-traditional types. As used herein "hybridization," refers to the binding, duplexing, or hybridizing of a molecule only to a particular nucleotide sequence under low, medium, or highly stringent conditions, including when that sequence is present in a complex mixture (e.g., total cellular) DNA or RNA. See e.g. Ausubel, et al., Current Protocols In Molecular Biology, John Wiley & Sons, New York, N.Y., 1993. If a nucleotide at a certain position of a polynucleotide is capable of forming a Watson-Crick pairing with a nucleotide at the same position in an anti-parallel DNA or RNA strand, then the polynucleotide and the DNA or RNA molecule are complementary to each other at that position. The polynucleotide and the DNA or RNA molecule are "substantially complementary" to each other when a sufficient number of corresponding positions in each molecule are occupied by nucleotides that can hybridize or anneal with each other in order to affect the desired process. A complementary sequence is a sequence capable of annealing under stringent conditions to provide a 3'-terminal serving as the origin of synthesis of complementary chain.

"Identity," as known in the art, is a relationship between two or more polypeptide sequences or two or more polynucleotide sequences, as determined by comparing the sequences. In the art, "identity" also means the degree of sequence relatedness between polypeptide or polynucleotide sequences, as determined by the match between strings of such sequences. "Identity" and "similarity" can be readily calculated by known methods, including, but not limited to, those described in Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part I, Griffin, A. M., and Griffin, H. G., eds., Humana Press, New Jersey, 1994; Sequence Analysis in Molecular Biology, von Heinje, G., Academic Press, 1987; and Sequence Analysis Primer, Gribskov, M. and Devereux, J., eds., M Stockton Press, New York, 1991; and Carillo, H., and Lipman, D., Siam J. Applied Math., 48:1073 (1988). In addition, values for percentage identity can be obtained from amino acid and nucleotide sequence alignments generated using the default settings for the AlignX component of Vector NTI Suite 8.0 (Informax, Frederick, Md.). Preferred methods to determine identity are designed to give the largest match between the sequences tested. Methods to determine identity and similarity are codified in publicly available computer programs. Preferred computer program methods to determine identity and similarity between two sequences include, but are not limited to, the GCG program package (Devereux, J., et al., Nucleic Acids Research 12(1): 387 (1984)), BLASTP, BLASTN, and FASTA (Atschul, S. F. et al., J. Molec. Biol. 215:403-410 (1990)). The BLAST X program is publicly available from NCBI and other sources (BLAST Manual, Altschul, S., et al., NCBINLM NIH Bethesda, Md. 20894: Altschul, S., et al., J. Mol. Biol. 215:403-410 (1990). The well-known Smith Waterman algorithm may also be used to determine identity.

If used herein, the terms "amplify", "amplifying", "amplification reaction" and their variants, refer generally to any action or process whereby at least a portion of a nucleic acid molecule (referred to as a template nucleic acid molecule) is replicated or copied into at least one additional nucleic acid molecule. The additional nucleic acid molecule optionally includes sequence that is substantially identical or substantially complementary to at least some portion of the template nucleic acid molecule. The template nucleic acid molecule can be single-stranded or double-stranded and the additional nucleic acid molecule can independently be single-stranded or double-stranded. In some embodiments, amplification includes a template-dependent in vitro enzyme-catalyzed reaction for the production of at least one copy of at least some portion of the nucleic acid molecule or the production of at least one copy of a nucleic acid sequence that is complementary to at least some portion of the nucleic acid molecule. Amplification optionally includes linear or exponential replication of a nucleic acid molecule. In some embodiments, such amplification is performed using isothermal conditions; in other embodiments, such amplification can include thermocycling. In some embodiments, the amplification is a multiplex amplification that includes the simultaneous amplification of a plurality of target sequences in a single amplification reaction. At least some of the target sequences can be situated, on the same nucleic acid molecule or on different target nucleic acid molecules included in the single amplification reaction. In some embodiments, "amplification" includes amplification of at least some portion of DNA- and RNA-based nucleic acids alone, or in combination. The amplification reaction can include single or double-stranded nucleic acid substrates and can further including any of the amplification processes known to one of ordinary skill in the art. In some embodiments, the amplification reaction includes polymerase chain reaction (PCR). In the present invention, the terms "synthesis" and "amplification" of nucleic acid are used. The synthesis of nucleic acid in the present invention means the elongation or extension of nucleic acid from an oligonucleotide serving as the origin of synthesis. If not only this synthesis but also the formation of other nucleic acid and the elongation or extension reaction of this formed nucleic acid occur continuously, a series of these reactions is comprehensively called amplification. The polynucleic acid produced by the amplification technology employed is generically referred to as an "amplicon" or "amplification product."

A number of nucleic acid polymerases can be used in the amplification reactions utilized in certain embodiments provided herein, including any enzyme that can catalyze the polymerization of nucleotides (including analogs thereof) into a nucleic acid strand. Such nucleotide polymerization can occur in a template-dependent fashion. Such polymerases can include without limitation naturally occurring polymerases and any subunits and truncations thereof, mutant polymerases, variant polymerases, recombinant, fusion or otherwise engineered polymerases, chemically modified polymerases, synthetic molecules or assemblies, and any analogs, derivatives or fragments thereof that retain the ability to catalyze such polymerization. Optionally, the polymerase can be a mutant polymerase comprising one or more mutations involving the replacement of one or more amino acids with other amino acids, the insertion or deletion of one or more amino acids from the polymerase, or the linkage of parts of two or more polymerases. Typically, the polymerase comprises one or more active sites at which nucleotide binding and/or catalysis of nucleotide polymerization can occur. Some exemplary polymerases include without limitation DNA polymerases and RNA polymerases. If used herein, the term "polymerase" and its variants, as used herein, also includes fusion proteins comprising at least two portions linked to each other, where the first portion comprises a peptide that can catalyze the polymerization of nucleotides into a nucleic acid strand and is linked to a second portion that comprises a second polypeptide. In some embodiments, the second polypeptide can include a reporter enzyme or a processivity-enhancing domain. Optionally, the polymerase can possess 5' exonuclease activity or terminal transferase activity. In some embodiments, the polymerase can be optionally reactivated, for example through the use of heat, chemicals or re-addition of new amounts of polymerase into a reaction mixture. In some embodiments, the polymerase can include a hot-start polymerase or an aptamer-based polymerase that optionally can be reactivated.

If used herein, the terms "target primer" or "target-specific primer" and variations thereof refer to primers that are complementary to a binding site sequence. Target primers are generally a single stranded or double-stranded polynucleotide, typically an oligonucleotide, that includes at least one sequence that is at least partially complementary to a target nucleic acid sequence.

If used herein, the "Forward primer binding site" and "reverse primer binding site" refers to the regions on the template DNA and/or the amplicon to which the forward and reverse primers bind. The primers act to delimit the region of the original template polynucleotide which is exponentially amplified during amplification. In some embodiments, additional primers may bind to the region 5' of the forward primer and/or reverse primers. Where such additional primers are used, the forward primer binding site and/or the reverse primer binding site may encompass the binding regions of these additional primers as well as the binding regions of the primers themselves. For example, in some embodiments, the method may use one or more additional primers which bind to a region that lies 5' of the forward and/or reverse primer binding region. Such a method was disclosed, for example, in WO0028082 which discloses the use of "displacement primers" or "outer primers".

If used herein, a 'barcode' nucleic acid identification sequence can be incorporated into a nucleic acid primer or linked to a primer to enable independent sequencing and identification to be associated with one another via a barcode which relates information and identification that originated from molecules that existed within the same sample. There are numerous techniques that can be used to attach barcodes to the nucleic acids within a discrete entity. For example, the target nucleic acids may or may not be first amplified and fragmented into shorter pieces. The molecules can be combined with discrete entities, e.g., droplets, containing the barcodes. The barcodes can then be attached to the molecules using, for example, splicing by overlap extension. In this approach, the initial target molecules can have "adaptor" sequences added, which are molecules of a known sequence to which primers can be synthesized. When combined with the barcodes, primers can be used that are complementary to the adaptor sequences and the barcode sequences, such that the product amplicons of both target nucleic acids and barcodes can anneal to one another and, via an extension reaction such as DNA polymerization, be extended onto one another, generating a double-stranded product including the target nucleic acids attached to the barcode sequence. Alternatively, the primers that amplify that target can themselves be barcoded so that, upon annealing and extending onto the target, the amplicon produced has the barcode sequence incorporated into it. This can be applied with a number of amplification strategies, including specific amplification with PCR or non-specific amplification with, for example, MDA. An alternative enzymatic reaction that can be used to attach barcodes to nucleic acids is ligation, including blunt or sticky end ligation. In this approach, the DNA barcodes are incubated with the nucleic acid targets and ligase enzyme, resulting in the ligation of the barcode to the targets. The ends of the nucleic acids can be modified as needed for ligation by a number of techniques, including by using adaptors introduced with ligase or fragments to enable greater control over the number of barcodes added to the end of the molecule.

If used herein, the terms "identity" and "identical" and their variants, as used herein, when used in reference to two or more nucleic acid sequences, refer to similarity in sequence of the two or more sequences (e.g., nucleotide or polypeptide sequences). In the context of two or more homologous sequences, the percent identity or homology of the sequences or subsequences thereof indicates the percentage of all monomeric units (e.g., nucleotides or amino acids) that are the same (i.e., about 70% identity, preferably 75%, 80%, 85%, 90%, 95%, 97%, 98% or 99% identity). The percent identity can be over a specified region, when compared and aligned for maximum correspondence over a comparison window, or designated region as measured using a BLAST or BLAST 2.0 sequence comparison algorithms with default parameters described below, or by manual alignment and visual inspection. Sequences are said to be "substantially identical" when there is at least 85% identity at the amino acid level or at the nucleotide level. Preferably, the identity exists over a region that is at least about 25, 50, or 100 residues in length, or across the entire length of at least one compared sequence. A typical algorithm for determining percent sequence identity and sequence similarity are the BLAST and BLAST 2.0 algorithms, which are described in Altschul et al, Nuc. Acids Res. 25:3389-3402 (1977). Other methods include the algorithms of Smith & Waterman, Adv. Appl. Math. 2:482 (1981), and Needleman & Wunsch, J. Mol. Biol. 48:443 (1970), etc. Another indication that two nucleic acid sequences are substantially identical is that the two molecules or their complements hybridize to each other under stringent hybridization conditions.

If used herein, the terms "nucleic acid," "polynucleotides," and "oligonucleotides" refers to biopolymers of nucleotides and, unless the context indicates otherwise, includes modified and unmodified nucleotides, and both DNA and RNA, and modified nucleic acid backbones. For example, in certain embodiments, the nucleic acid is a peptide nucleic acid (PNA) or a locked nucleic acid (LNA). Typically, the methods as described herein are performed using DNA as the nucleic acid template for amplification. However, nucleic acid whose nucleotide is replaced by an artificial derivative or modified nucleic acid from natural DNA or RNA is also included in the nucleic acid of the present invention insofar as it functions as a template for synthesis of complementary chain. The nucleic acid of the present invention is generally contained in a biological sample. The biological sample includes animal, plant or microbial tissues, cells, cultures and excretions, or extracts therefrom. In certain aspects, the biological sample includes intracellular parasitic genomic DNA or RNA such as virus or *mycoplasma*. The nucleic acid may be derived from nucleic acid contained in said biological sample. For example, genomic DNA, or cDNA synthesized from mRNA, or nucleic acid amplified on the basis of nucleic acid derived from the biological sample, are preferably used in the described methods. Unless denoted otherwise, whenever a oligonucleotide sequence is represented, it will be understood that the nucleotides are in 5' to 3' order from left to right and that "A" denotes deoxyadenosine, "C" denotes deoxycytidine, "G" denotes deoxyguanosine, "T" denotes thymidine, and "U' denotes deoxyuridine. Oligonucleotides are said to have "5' ends" and "3' ends" because mononucleotides are typically reacted to form oligonucleotides via attachment of the 5' phosphate or equivalent group of one nucleotide to the 3' hydroxyl or equivalent group of its neighboring nucleotide, optionally via a phosphodiester or other suitable linkage.

A template nucleic acid is a nucleic acid serving as a template for synthesizing a complementary chain in a nucleic acid amplification technique. A complementary chain having a nucleotide sequence complementary to the template has a meaning as a chain corresponding to the template, but the relationship between the two is merely relative. That is, according to the conventional methods which may be referenced herein a chain synthesized as the complementary chain can function again as a template. That is, the complementary chain can become a template. In certain embodiments, the template is derived from a biological sample, e.g., plant, animal, virus, micro-organism, bacteria, fungus, etc. In certain embodiments, the animal is a mammal, e.g., a human patient. A template nucleic acid typically comprises one or more target nucleic acid. A target nucleic acid in exemplary embodiments may comprise any single or double-stranded nucleic acid sequence that can be amplified or synthesized according to the disclosure, including any nucleic acid sequence suspected or expected to be present in a sample.

Primers and oligonucleotides used in embodiments herein comprise nucleotides. A nucleotide comprises any compound, including without limitation any naturally occurring nucleotide or analog thereof, which can bind selectively to, or can be polymerized by, a polymerase. Typically, but not necessarily, selective binding of the nucleotide to the polymerase is followed by polymerization of the nucleotide into a nucleic acid strand by the polymerase; occasionally however the nucleotide may dissociate from the polymerase without becoming incorporated into the nucleic acid strand, an event referred to herein as a "non-productive" event. Such nucleotides include not only naturally occurring nucleotides but also any analogs, regardless of their structure, that can bind selectively to, or can be polymerized by, a polymerase. While naturally occurring nucleotides typically comprise base, sugar and phosphate moieties, the nucleotides of the present disclosure can include compounds lacking any one, some or all of such moieties. For example, the nucleotide can optionally include a chain of phosphorus atoms comprising three, four, five, six, seven, eight, nine, ten or more phosphorus atoms. In some embodiments, the phosphorus chain can be attached to any carbon of a sugar ring, such as the 5' carbon. The phosphorus chain can be linked to the sugar with an intervening O or S. In one embodiment, one or more phosphorus atoms in the chain can be part of a phosphate group having P and O. In another embodiment, the phosphorus atoms in the chain can be linked together with intervening O, NH, S, methylene, substituted methylene, ethylene, substituted ethylene, $CNH_2$, C(O), $C(CH_2)$, $CH_2CH_2$, or $C(OH)CH_2R$ (where R can be a 4-pyridine or 1-imidazole). In one embodiment, the phosphorus atoms in the chain can have side groups having O, BH3, or S. In the phosphorus chain, a phosphorus atom with a side group other than O can be a substituted phosphate group. In the phosphorus chain, phosphorus atoms with an intervening atom other than O can be a substituted phosphate group. Some examples of nucleotide analogs are described in Xu, U.S. Pat. No. 7,405,281.

In some embodiments, the nucleotide may comprise a label and referred to herein as a "labeled nucleotide"; the label of the labeled nucleotide is referred to herein as a "nucleotide label". In some embodiments, the label can be in the form of a fluorescent moiety (e.g. dye), luminescent moiety, or the like attached to the terminal phosphate group, i.e., the phosphate group most distal from the sugar. Some examples of nucleotides that can be used in the disclosed methods and compositions include, but are not limited to, ribonucleotides, deoxyribonucleotides, modified ribonucleotides, modified deoxyribonucleotides, ribonucleotide polyphosphates, deoxyribonucleotide polyphosphates, modified ribonucleotide polyphosphates, modified deoxyribonucleotide polyphosphates, peptide nucleotides, modified peptide nucleotides, metallonucleosides, phosphonate nucleosides, and modified phosphate-sugar backbone nucleotides, analogs, derivatives, or variants of the foregoing compounds, and the like. In some embodiments, the nucleotide can comprise non-oxygen moieties such as, for example, thio- or borano-moieties, in place of the oxygen moiety bridging the alpha phosphate and the sugar of the nucleotide, or the alpha and beta phosphates of the nucleotide, or the beta and gamma phosphates of the nucleotide, or between any other two phosphates of the nucleotide, or any combination thereof. "Nucleotide 5'-triphosphate" refers to a nucleotide with a triphosphate ester group at the 5' position, and are sometimes denoted as "NTP", or "dNTP" and "ddNTP" to particularly point out the structural features of the ribose sugar. The triphosphate ester group can include sulfur substitutions for the various oxygens, e.g. $\alpha$-thio-nucleotide 5'-triphosphates. For a review of nucleic acid chemistry, see: Shabarova, Z. and Bogdanov, A. Advanced Organic Chemistry of Nucleic Acids, VCH, New York, 1994.

Any nucleic acid amplification method may be utilized in conjunction with the disclosure, such as a PCR-based assay, e.g., quantitative PCR (qPCR), or an isothermal amplification may be used to detect the presence of certain nucleic acids, e.g., genes, of interest, present in discrete entities or one or more components thereof, e.g., cells encapsulated therein. Such assays can be applied to discrete entities within a microfluidic device or a portion thereof or any other suitable location. The conditions of such amplification or PCR-based assays may include detecting nucleic acid amplification over time and may vary in one or more ways.

In certain embodiments, the disclosure relates to a construction of nanoparticles and a molecular wire that provides a preferred bridge molecule for use in molecular electronics circuits. In certain embodiments, the bridge molecule may be used in molecular sensor circuits. In another embodiment, the disclosure relates to production and use of molecular electronics sensors based on such construct. In another embodiment, the disclosure relates to methods for the assembly of such constructs into nano-circuits. In still another embodiment, the disclosure provides methods of constructing and using molecular electronic sensors using this construct. In yet another embodiment, the disclosure provides means of making and applying CMOS chip-based sensor array devices, with arrays of sensors comprising these nanoparticle constructs.

In certain embodiments, the disclosure makes it possible to efficiently and rapidly direct the disclosed embodiments into the circuit using dielectrophoretic forcing. In an exemplary application, the driving force is enhanced by the presence of the nanoparticles. It is an advantage of the disclosure that many types of nanoparticles and bridge molecules can be incorporated in the disclosed embodiments, to provide diverse performance properties. It is another advantage of the disclosure that electron microscope imaging can be used to verify that a single molecule bridge is in a nano-circuit, by visualization of the metallic nanoparticles of the construct. It is still another advantage of the disclosure that efficient means of producing and purifying these constructs are provided. It is another advantage of the disclosure to provide means for populating CMOS chip sensor array devices with such molecular electronic sensors.

In various aspects of this disclosure, a molecular wire is joined to two nanoparticle, one at each end, by a suitable conjugation reaction, and the resulting product of this reaction is purified by various means, to produce a population of molecules enriched to provide the so-called 'dumbbell' form. In various aspects of this disclosure, the dumbbells are positioned to span the gap between nanoelectrodes to form a complete electrical circuit. In various aspects of this disclosure, dielectrophoretic trapping is used to position these dumbbell bridges into the circuit, to provide for rapid and efficient assembly of these into circuits. In one embodiment, the conductivity of the circuit is monitored, and the detection of a jump in conductivity is used to turn off the driving voltage, and therefore preferentially result in only a single dumbbell bridge spanning the gap, so as to achieve a single-molecule molecular electronic circuit. In various embodiments these circuits are formatted into a large array of such circuits on a semiconductor chip device, and in some embodiments, a CMOS chip.

In one embodiment, the molecular wire of the dumbbell construct also comprises a probe. The molecular electronics sensor may be used as a binding probe or an enzyme. Thus, the dumbbell-circuits may be used as sensors, for applications such as DNA sequencing or detection or characterization of analytes in solution, such as DNA, proteins, or antigens.

Certain embodiments of the disclosure also provide methods of manufacturing and use for single molecule double stranded nucleic acid-metal nanoparticle complex or dumbbells which may be used in forming conductive molecular bridges. An exemplary manufacturing method may include: a double stranded nucleic acid conjugated to a gold nanoparticle on each end; purified from aggregates to achieve single molecules using size-exclusion chromatography; captured between a pair of nanoelectrodes separated by a gap using dielectrophoretic trapping; and used to form a conductive bridge for genome sequencing and molecular detection.

In various embodiments, single molecule double stranded nucleic acid-metal nanoparticle complexes or dumbbells are disclosed wherein a biomolecule is conjugated to a metal nanoparticle on either end. Single complexes of nanoparticle-biomolecule-nanoparticle or dumbbell species may be purified from a larger aggregates and single nanoparticles using size exclusion chromatography. As used herein, the term "DNA" or "nucleic acid" refers generally to not only to the formal meaning of deoxyribonucleic acid, but also, in contexts where it would makes sense, to the well-known nucleic acid analogs of DNA that are used throughout molecular biology and biotechnology, such as RNA, or RNA or DNA comprising modifications such as bases having chemical modifications, such as addition of conjugation groups at the 5' or 3' termini or on internal bases, or which includes nucleic acids analogues, such as peptide nucleic acid (PNA) or locked nucleic acid (LNA). DNA may generally refer to double stranded or single stranded forms in contexts where this makes sense, and unless specifically designated. In particular, when referring to hybridization and the probes and targets for a DNA molecule, they are interpreted in this broader sense of any of these analogs that undergo hybridization to form a bound duplex.

In certain embodiments, a molecular circuit is disclosed. Dumbbells are trapped between a pair of nanoelectrodes separated by a gap. The gap may be substantially equal to the length of the dumbbell molecule to form a molecular bridge between the nano-electrodes. In one embodiment, one nanoparticle of the dumbbell is bound to a positive and the opposite nanoparticle of the dumbbell is bound to the negative electrode. These molecules may define and visualize single molecule nanowires which is otherwise not possible using electron microscopy. These molecules can also enable one time optimization of dielectrophoretic trapping parameters for several biomolecules as the trapping is dictated by the highly polarizable nanoparticles.

In various embodiments, the dumbbells are substantially trapped between a pair of nanoelectrodes fabricated on a Complementary Metal-Oxide Semiconductor (CMOS) chip with, for example, 16,384 pairs of palladium nanoelectrodes.

In various aspects, the nanoparticle is made of gold, platinum, palladium, silver, silica, carbon nanospheres. Various surface ligands such as citrate, amine, tannic acid, dodecanethiol, carboxyl, polyethylene glycol (PEG), Polyvinylpyrrolidone (PVP) may be capped onto the nanoparticle.

In various aspects, the nanoparticle may have a diameter of about 1-5 nm, 5-10 nm, 10-20 nm, 20-30 nm, 30-40 nm, 40-50 nm, or 50-100 nm, or greater than 100 nm.

In various aspects, the biomolecule may be selected from a group consisting of single stranded nucleic acid, a double stranded nucleic acid, a peptide, a peptide nucleic acid, a protein alpha helix, a graphene nanotube, a protein, an enzyme, or an enzyme modified to have conjugation groups or molecular wire arms with conjugation groups. In various aspects, the bridge molecule may also comprise a probe molecule, conjugated to the bridge, or otherwise integrated into it, such as a DNA oligo, RNA, an antibody, an aptamer, an antigen, a binding protein, or any enzyme, such as a polymerase.

In various aspects, the biomolecule has a total length of 10-15 nm, 15-25 nm, 25-35 nm, 35-45 nm, 45-100 nm, 100 nm-500 nm, 500 nm-1 μm.

In various aspects, the nanoparticle and biomolecule are conjugated via thiol-gold bond, amide bond, click chemistry, biotin-streptavidin, and antigen-antibody, or metal or material binding peptides. Many variations on these, o other means of conjugation, are well known to those skilled in the art.

As further discussed below in relation to FIG. 2, dumbbell particles may be assembled onto nanoelectrodes by means such as passive diffusion, DC voltage driven trapping (known as electrophoresis, or electrokinetics), or AC voltage driven trapping, also known as dielectrophoresis.

Illustrative Embodiments

Figure 1C:
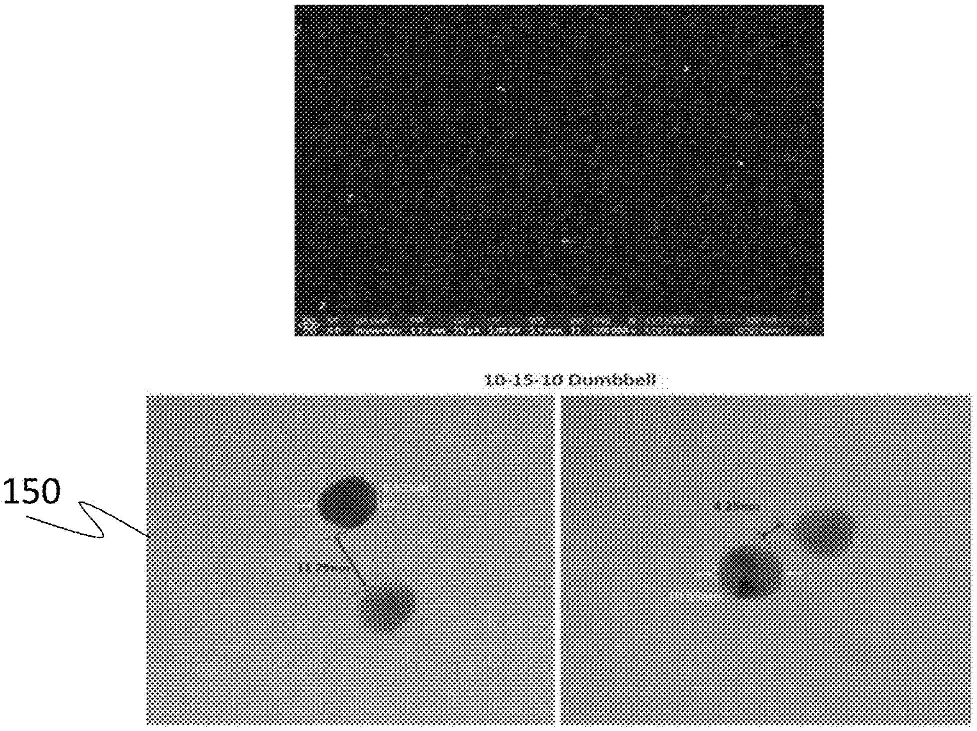
FIG. 1C illustrates an exemplary method for validating single molecule dumbbells produced and purified in FIGS. 1A and 1B.

FIGS. 1A-1C illustrate the methodology for fabricating, purifying and validating single molecule dumbbells. Specifically, FIG. 1A illustrates the conjugation of gold nanoparticles to double stranded DNA to form a nanoparticle complex dumbbell. In FIG. 1A, a citrate complex 102 is incubated with bis(p-sulfonatophenyl)phenylphosphine dihydrate dipotassium salt (BSPP) at about 25° C. for a period of about 8 hours in order to substantially stabilize the citrate compound 104. The stabilized compound 104 is then combined with thiolated double stranded DNA (dsDNA) 106 and incubated at about 25° C. for a period of about 72 hours. The combination yields a quantity of single molecule dumbbells 120 according to an exemplary embodiment of the disclosed principles. As shown in FIG. 1A, dumbbell 120 comprises nanoparticles 108, 110 and biomolecule 109. In the exemplary representation of FIG. 1A, biomolecule 109 is a dsDNA. Other biomolecule compositions or nanoparticles may be used without departing from the instant disclosure.

Producing the nanoparticle complex may result in particles of varying sizes. In one embodiment, a purification step is used to purify and filter the appropriate dumbbells from the aggregates.

FIG. 1B illustrates purification of single molecule species using Size Exclusion Chromatography (SEC) column. SEC may be used to separate the purified single molecule nanoparticle complex from aggregates. In FIG. 1B, samples (e.g., from FIG. 1A) are loaded in a high-pressure liquid chromatography (HPLC) vial and are passed through an SEC column. In one implementation, a purification buffer was used. The collected samples were subjected to HPLC, and the results are shown at FIG. 1B.

FIG. 1C illustrates, SEM/TEM verification of the results. Specifically, FIG. 1C illustrates a spot 4-5 μl of the collected fraction onto a thin metal film which was then allowed to bind for about 10 minutes. The sample was then dried with $N_2$ gas, and an image was taken. Image 150 illustrates the nanoparticle complex in which the nanoparticles ends of the dumbbell are about 11.79 nm apart. Each nano particle is about 9.51 nm in diameter. Image 155 illustrates a complex in which nanoparticles are about 4.25 nm apart and each nanoparticle is about 10.65 nm in diameter. The results verifies the results of steps of FIGS. 1A and 1B.

Figure 2:
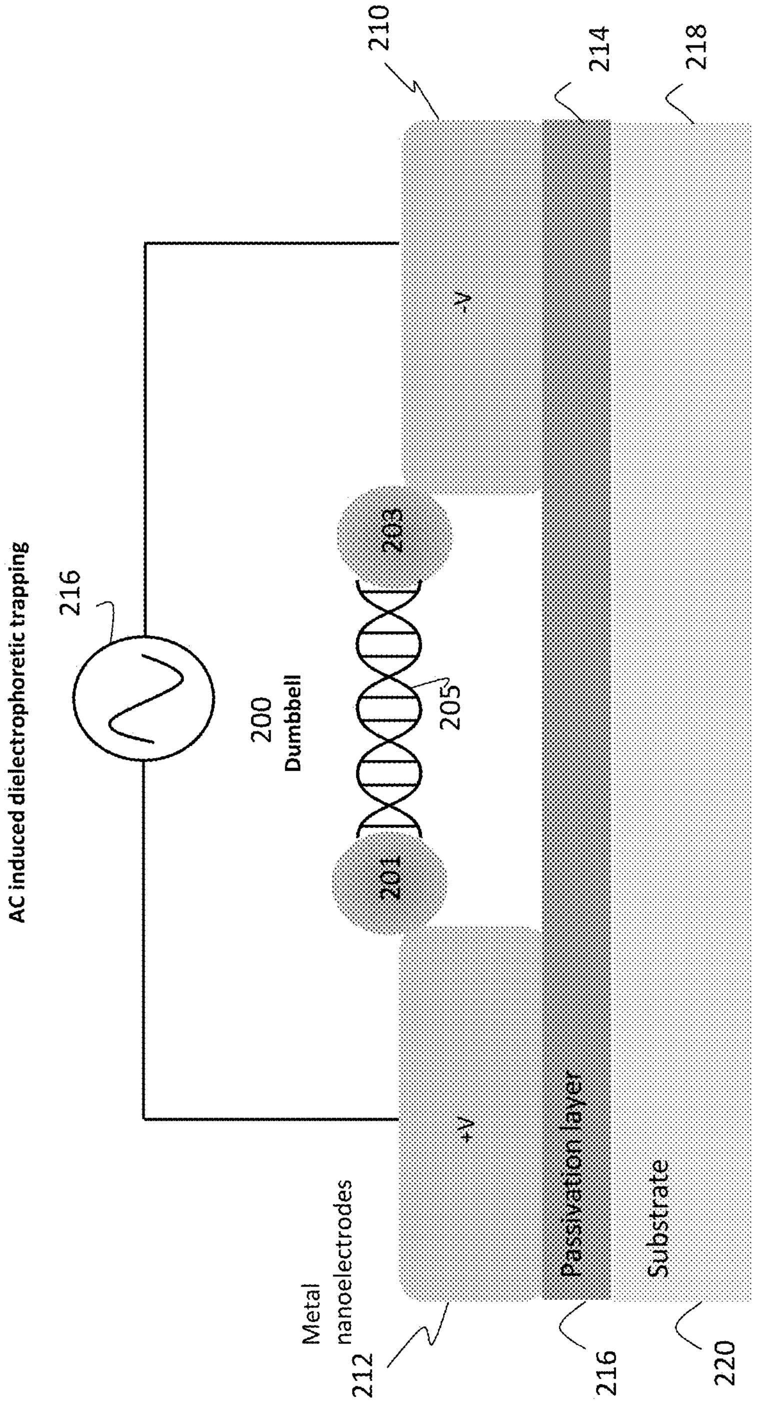
FIG. 2 illustrates an exemplary application for dielectrophoretic trapping of a dumbbell on a pair of nanoelectrodes.

FIG. 2 illustrates an exemplary application for dielectrophoretic trapping of a dumbbell on a pair of nanoelectrodes. The nanoparticle complex dumbbell 200 is coupled to nano electrodes 212 and 210. Nanoelectrodes 210, 212 are formed over substrate 220 with passivation layer to form an electric circuit. Nanoelectrodes 210 and 212 may be separated by a gap. The gap may be substantially equal to the length of the dumbbell molecule 200 to form a molecular bridge between nano-electrodes 210 and 212. Dumbbell 200 is substantially trapped between nanoelectrodes 210 and 212 which may be fabricated on a CMOS chip. In the illustrative embodiment of FIG. 2, dumbbell 205 is bound to positive nanoelectrode 212 and negative nanoelectrode 210 via nanoparticles 201 and 203, respectively. As discussed further with respect to FIG. 12, the completed circuit can visualize single molecule nanowire which is otherwise not possible using conventional electron microscopy.

Referring again to FIG. 2, dumbbell 200 comprises nanoparticles 201 and 203 which are separated by biomolecule nanowire (dsDNA) 205. Nanoparticles 201, 203 may be coupled to electrodes 212, 210, respectively, via surface ligand (not shown). Exemplary surface ligands may include citrate, amine, tannic acid, dodecanethiol, carboxyl, PEG, PVP. The surface ligands may be capped onto nanoparticles 201, 203.

trapping circuit consists of AC frequency generator

Nanoelectrodes 212 and 210 may be coupled to AC frequency generator 216 (interchangeably, dielectrophoretic trapping source 216).

In one implementation, dumbbell 200 is positioned to span the gap between nanoelectrodes 212, 210 to form a complete electrical circuit as illustrated in FIG. 2. By way of example, dielectrophoretic trapping can be used to position dumbbell 200 as a bridge into the circuit of FIG. 2. Dielectrophoretic trapping may provide for rapid and efficient assembly of dumbbells 200 from a solution into the gaps spanning between a plurality of nanoelectrode pairs 210, 212.

In one embodiments, the conductivity of the circuit is monitored and the detection of a jump in conductivity is used to turn off the driving voltage, and therefore preferentially result in only a single dumbbell bridge spanning the gap. Once the gap is spanned with the dumbbell nanobridge 200, a single-molecule molecular electronic circuit is considered to have been formed. While FIG. 2 illustrates a single dumbbell nanobridge circuit, it is understood that a sensor circuit having multiple circuits (or array of circuits as illustrated in FIG. 2) may be formed using the disclosed principles.

In an application of the circuit of FIG. 2, the system may include a polymerase (not shown) coupled to nanowire 205. The polymerase (not shown) may engage a DNA strand (not shown) to detect incorporate event (e.g., nucleotide monomers) at the DNA strand (not shown) by, for example, detecting change(s) in charge flowing through nanowire 205.

FIG. 3 provides exemplary DNA sequences used for nanoparticle nanowire construction. As shown in FIG. 3, the nanowires may have different lengths and compositions. Certain listed oligonucleotides include 15 and 25 nm thiolated forward and reverse sequences as well as 25 nm dual-thiolated forward and reverse sequences. A bridge molecule or nanowire, or a circuit or sensor implementing such a molecule, may comprise the nucleic acid sequences listed in FIG. 3. Variations and modifications on these particular sequences are also envisioned. For example, in some implementations, nucleic acids or oligonucleotides having at least 80%, at least 85%, at least 90%, at least 95%, or at least 98% sequence identity to a particular sequence listed in FIG. 3 are used for nanoparticle nanowire construction In other implementations, additional modified nucleic acid bases are used in the oligonucleotides.

Figure 4:
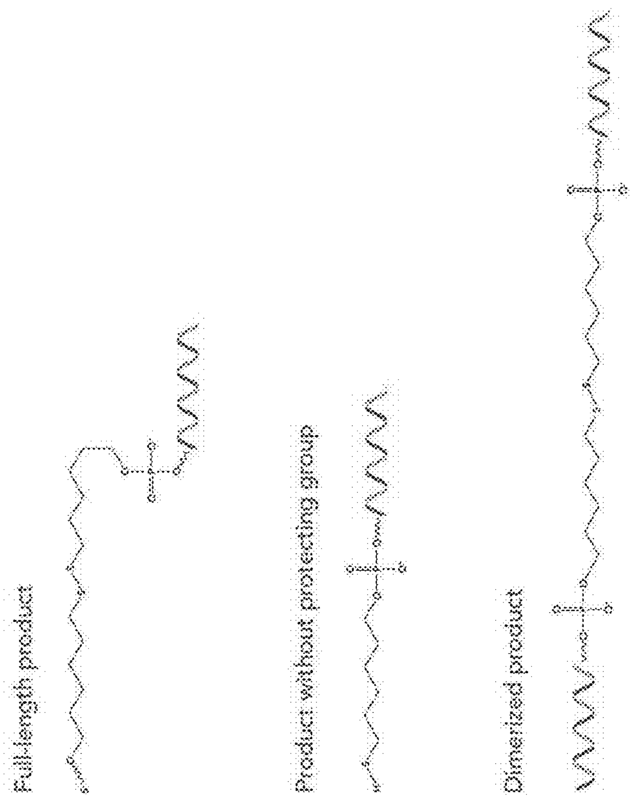
FIG. 4 illustrates several exemplary species of the thiolated oligonucleotides.

FIG. 4 illustrates several exemplary species of the thiolated oligonucleotides. Specifically, FIG. 4 illustrates an exemplary full-length product 402 which may be used as a nanowire. Structure 404 represents the product which without protecting group and structure 406 shows dimerized product.

FIG. 5 is an exemplary table showing calculation for conjugating a double-stranded thiolated oligonucleotide with gold (Au) nanoparticles (AuNPs). As in indicated at FIG. 5, the 15 nm thiol DNA and the 15 nm control DNA perform substantially identically.

Illustrative Examples

Passivation of citrate capped gold nanoparticles with BSPP—Ten (10) nm bare citrate coated AuNPs were used throughout this study. The AuNPs were obtained from Nanocomposix™. Bis(p-sulfonatophenyl)phenylphosphine dihydrate dipotassium salt (BSPP) was used to passivate the AuNPs in this study. (See FIG. 1) BSPP molecules replace the citrate molecules on the surface of the nanoparticles and are known to prevent aggregation under high salt conditions. Studies have suggested that BSPP imparts a net negative charge on the surface of the nanoparticles and thus rendering the nanoparticles more stable. A 100× stock of the BSPP solution is prepared at 314 mM concentration by weighing out the powder and dissolving it in ultrapure water. The solution is vortexed heavily and then filtered using Corning™ 0.2 mm syringe filters. 200 ml of AuNPs solution was filtered using a Spin-X Centrifuge Eppendorf filter at 10,000 RPM for 5 min to remove any aggregates and impurities. 199 ml of the filtered nanoparticles solution was incubated overnight at room temperature or about 25° C. in 1.5 ml Lo-DNA bind Eppendorf tubes with 1 ml of 10× BSPP (final concentration 3.14 mM) to get 200 ml of BSPP passivated Au nanoparticles.

Preparation of thiol-capped oligonucleotides-Oligonucleotides used in this study were obtained from Integrated DNA Technologies™ as single strands with 3'-thiol modification on both strands. The thiol group binds to a gold atom to form a covalent Au—S bond. The sequences provided in FIG. 3.

A negative control oligo lacking the 3' and 5' thiol groups was also obtained and prepared. The oligos were reconstituted in Low TE buffer at 100 mM. One (1) ml solution of each strand was added to 98 ml of annealing buffer containing 10 mM $MgCl_2$ and 10 mM borate buffer at ph8 to get 100 ml of 1 mM double-stranded DNA. The two strands were annealed in a thermal cycler. The annealing conditions were validated separately to ensure hybridization of the two strands using gel electrophoresis. After annealing, the oligo solution was incubated with at least 400× concentration of Tris(2-carboxyethyl)phosphine hydrochloride (TCEP) to reduce the thiol protecting groups from the 3' and 5' ends as shown in FIG. 4. The oligo-TCEP mix was incubated for at least 30 minutes at room temperature. Post incubation, the solution was filtered through a NAP-5 column to remove the protecting groups from the solution. The column was washed 5 times with the annealing buffer to equilibrate it. The oligo-TCEP mix was spun at 1000 RPM for 2 to capture the purified product. The oligos were prepared and ready to be conjugated with the nanoparticles.

Conjugation of gold nanoparticles to double stranded DNA—To conjugate the nanoparticles with the double stranded oligo, a concentration estimate was made by measuring the absorption of the AuNPs at 520 nm. 1 ml of the filtered (non-passivated) nanoparticle solution was diluted 100-fold in ultrapure water and spotted onto a Nanodrop which was blanked using ultrapure water. The measured optical density was divided by the molar extinction coefficient of a 10 nm Au nanoparticle (~1.01E+08) according to Beer-Lambert Law. The result was multiplied by 100 to account for the 100-fold dilution to get a concentration estimate (~130-158 nM). A conjugation buffer was prepared at a final concentration of 150 mM sodium chloride and 5 mM sodium citrate. The oligos from the previous step were mixed with the filtered nanoparticles in a 1:5 ratio with the nanoparticles in 5-fold excess. This was optimized in order to maximize the probability of binding a single double-stranded oligo to two nanoparticles. The remaining volume was filled with the conjugation buffer after calculating the appropriate dilution factor.

FIG. 5 displays an example calculation for the preparation of the conjugation mix. The conjugation mix was incubated on a thermoblock at 25° C., 300 RPM for 72 hours to allow formation of DNA-nanoparticles clusters.

HPLC purification-Size-exclusion chromatography (SEC) was used to achieve separation of single molecule dumbbell species from excess nanoparticles and aggregates. (See FIG. 2.) The separation was carried out by isocratic elution on an SEC column (Sepax SRT SEC-500, 5 μm, 500 Å7.8×300 mm) loaded on to an Agilent™ 1220 Infinity II LC System™. 1 L of the purification buffer composed of 2 mM sodium citrate and 5 mM SDS was prepared a day prior to the day of use and left on the bench overnight to allow formation of any precipitates. The buffer was filtered the next day using a Corning™ 0.2 μm filter system. The samples were injected in the following order: 1 μl of BSPP-passivated AuNPs diluted 1:10 in ultrapure water, 20 μl of 100 nM test and control oligonucleotides diluted in ultrapure water, 100 μl of the DNA-NP conjugation mixtures.

The method was setup for 21 minutes at a flow rate of 0.75 ml/min. The peaks were identified from their retention times recorded from the absorbance of AuNPs at 520 nm and DNA at 260 nm.

SEM analysis-6-10 μl of the eluted products were spotted onto gold, palladium, or ruthenium thin films and incubated for about 30 minutes at room temperature in a humid environment. The samples were blow-dried using nitrogen gas and mounted on SEM stubs using carbon tape. SEM imaging was carried out on FEI Apreo SEM.

TEM analysis-Eluted products were concentrated 25× using 0.5 ml 30K centrifugal filter units prior to TEM analysis. The filter was rinsed twice with 500 μl ultrapure water and spun at about 13000 RPM for 10 minutes. The eluted products were added to the membrane tube and spun at 13000 RPM for 5 minutes. Finally, the eppendorf tube was inverted to collect the sample by spinning at about 1000 RPM for 2 minutes. 1-2 μl of the concentrated sample was spotted on to a TEM grid and imaged.

Figure 6:
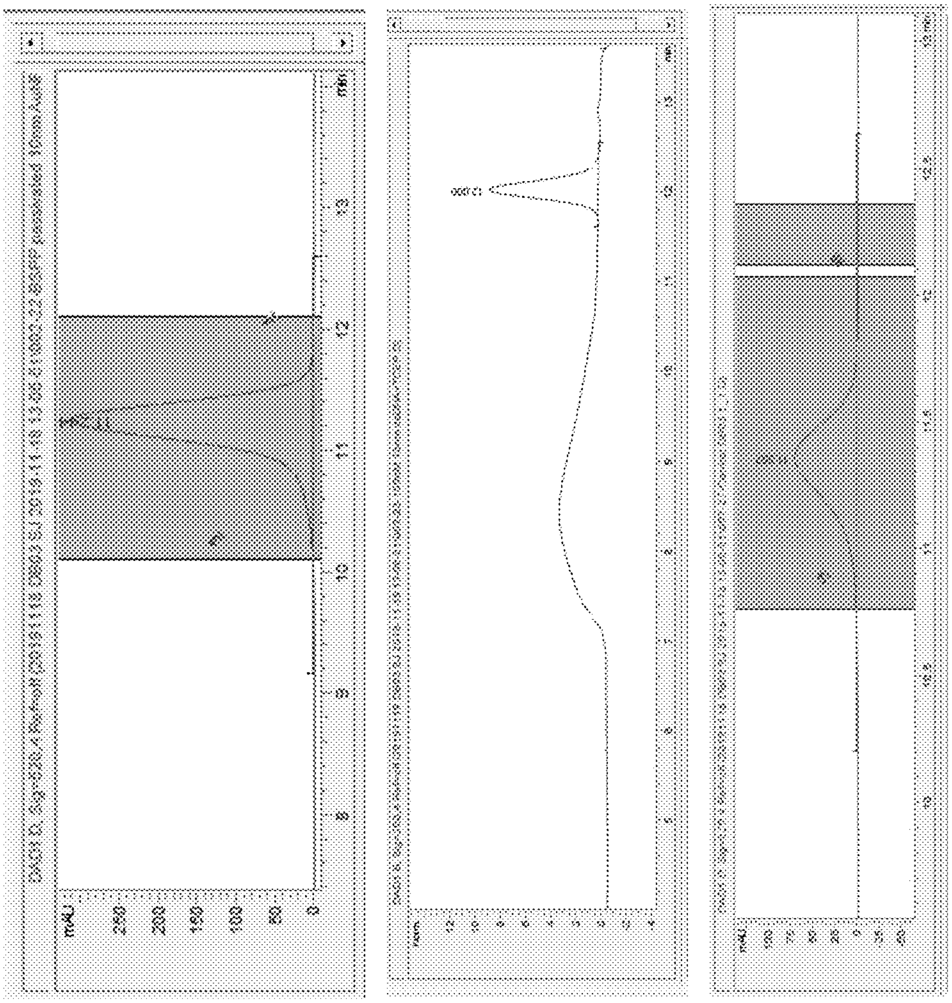
FIG. 6 shows chromatograms for gold nanoparticles, thiolated DNA, and a control non-thiolated DNA-NP mix.

Experimental results of HPLC chromatogram—FIG. 6 displays the chromatogram at 520 nm for the first injection corresponding to BSPP passivated AuNPs only. A sharp peak is observed at 11.244 minutes (A) indicating that all the injected sample has been eluted. FIG. 6 also displays the chromatogram at 260 nm for the second injection (B) corresponding to 100 nM of the thiolated 15 nm DNA. The control reaction non-thoilated DNA-AuNP is also shown (C).

Figure 7:
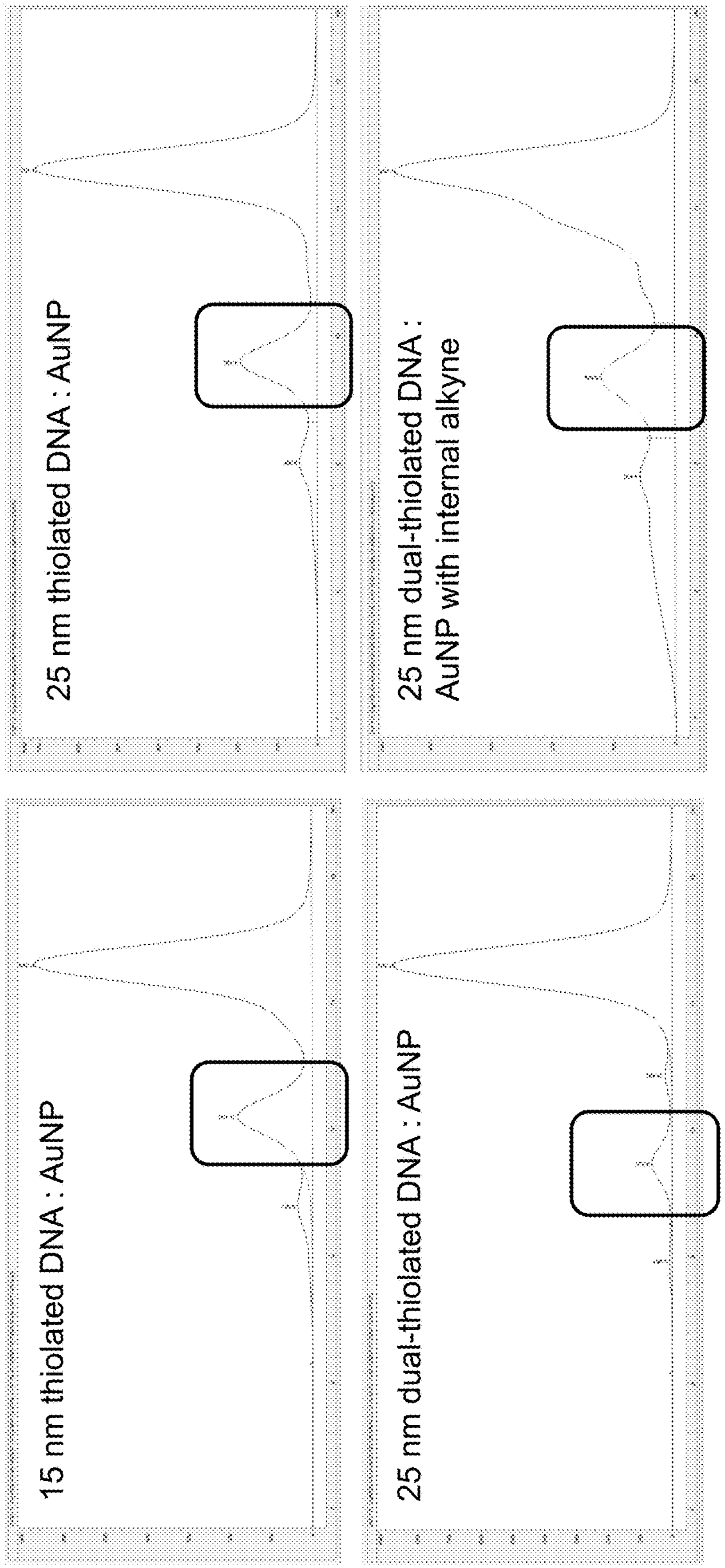
FIG. 7 shows chromatograms for 15 nm thiolated DNA-NP, 25 nm thiolated DNA-NP, 25 nm dual-thiolated DNA-NP, and 25 nm dual-thiolated DNA-NP with an internal alkyne on one of the strands with the desired species outlined in a box.

FIG. 7 displays the chromatogram at 520 nm for a DNA-NP solution at 1:5 ratio for four separate reactions. Three peaks were collected with elution times at approximately 8.3 minutes, 10 minutes, and 11.2 minutes. The earlier peaks correspond to structures larger than single nanoparticles. FIG. 7 also displays the chromatogram for the non-thiolated DNA-NP mixture showing only a single peak at 520 nm which indicates that non-specific binding does not take place between the DNA molecule and nanoparticles.

Figure 8:
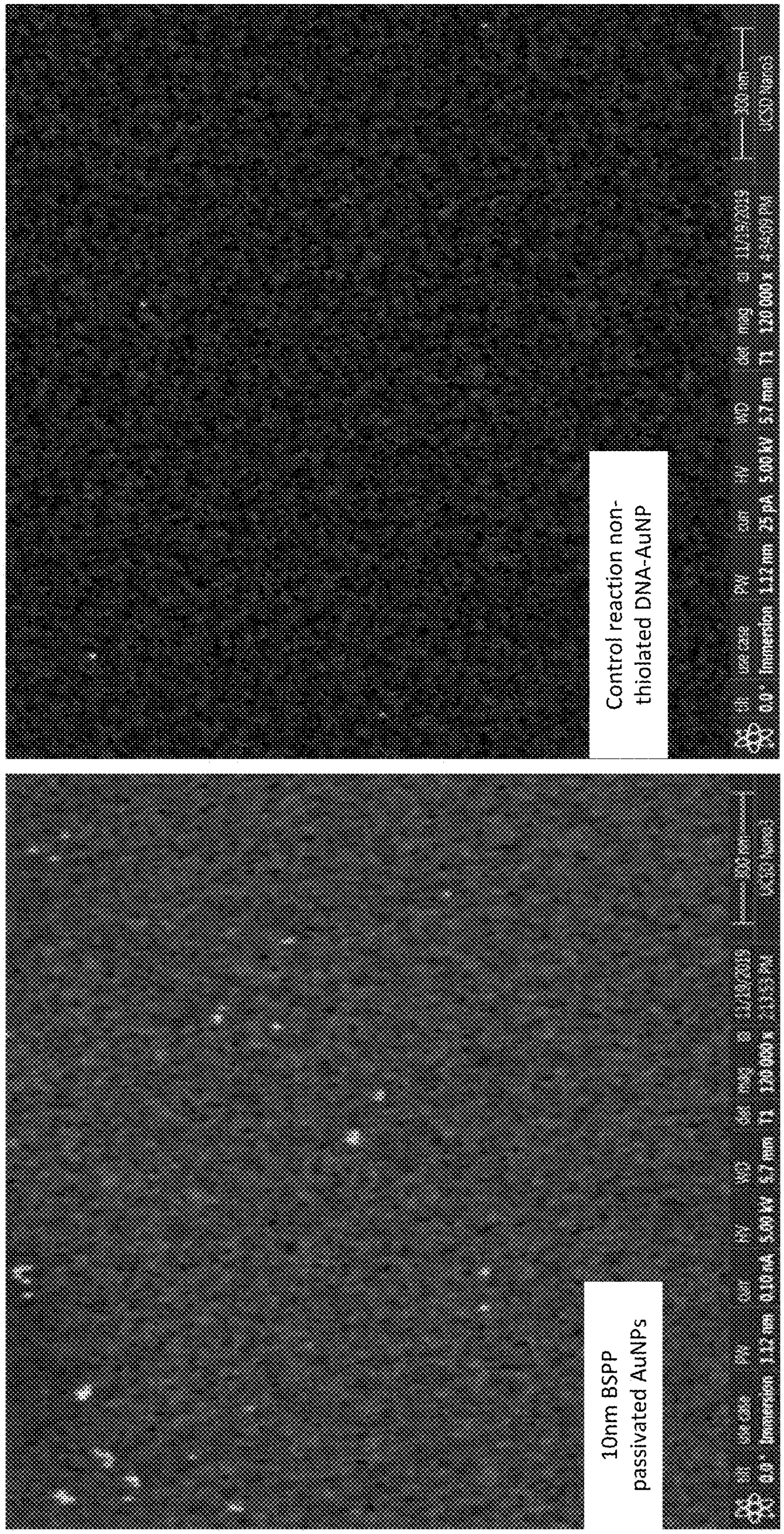
FIG. 8 shows SEM images of gold nanoparticles and eluted product from a control non-thiolated DNA-NP mix.

SEM measurements—FIG. 8 shows the SEM images taken from the control reactions. The image on the left (10 nm BSPP passivated AuNPs) consists of collected products from injecting AuNPs only. Single nanoparticles and clusters of greater than about 1 nanoparticle were observed in the captured images. The image on the right (control reaction non-thiolated DNA-AuNP) shows the collected products from the negative control reaction between non-thiolated oligo and nanoparticles. Only single nanoparticles were observed in the eluted products at 520 nm which indicates that non-specific binding of oligo to nanoparticles does not take place.

Figure 9:
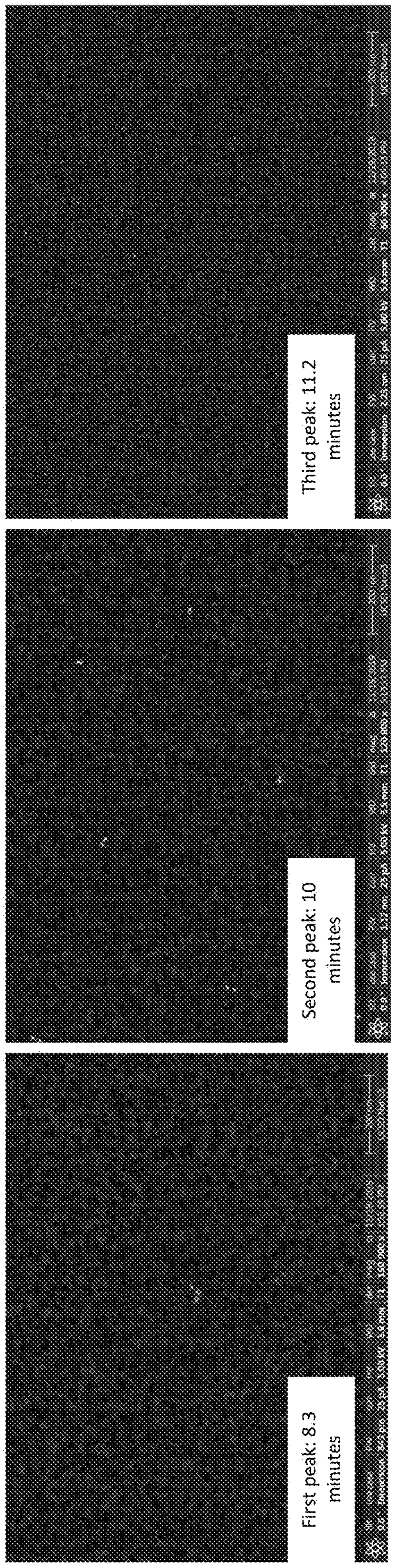
FIG. 9 shows SEM images of eluted products from a 15 nm thiolated DNA:NP 1:5 mix.

FIG. 9 shows the SEM images from the eluted products from the thiolated DNA:NP mix. The contents from the first peak at 8.3 minutes is observed to consist mainly of DNA-NP trimers. The contents from the second peak at 10 minutes is observed to consist mainly of the desired dimer species (NP-DNA-NP) or single molecule dumbbells. The contents from the third peak at 11.2 minutes is observed to consist mainly of individual nanoparticles or monomers; substantially identical to the contents from non-thiolated DNA-NP mix.

Figure 10:
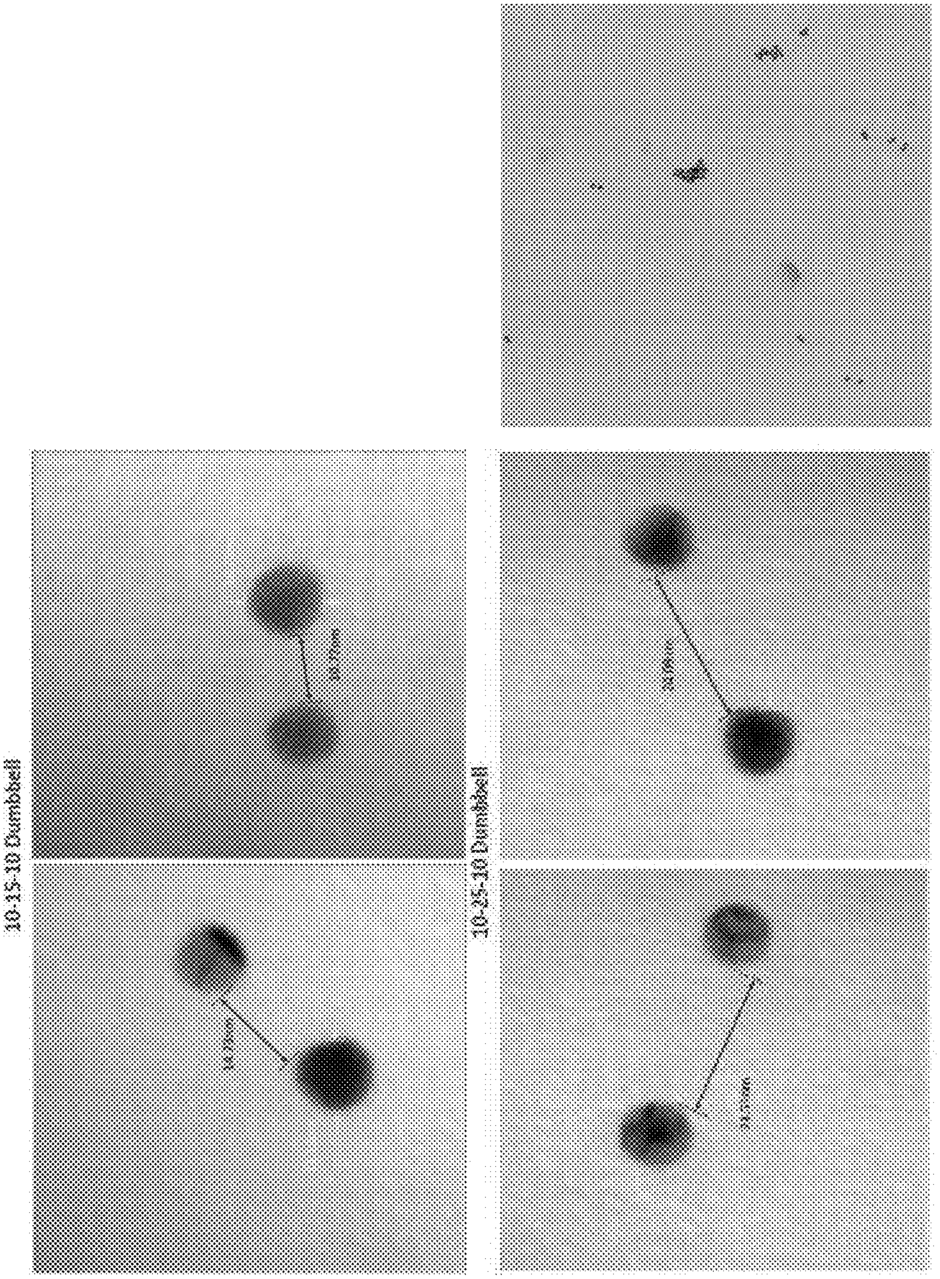
FIG. 10 shows TEM images of thiolated DNA:NP mix for 15 nm and 25 nm DNA, including aggregates observed while imaging.

TEM measurements—FIG. 10 shows the TEM images taken of the 25× concentrated dumbbells for 15 nm and 25 nm long ds-DNA molecules. Spacing between the nanoparticles in the aggregates is much less compared to the dimers. This indicates that the spacing can be attributed to the presence of DNA molecules in the dimers.

Dielectrophoretic trapping of dumbbell nanowires—Experimental Methods—Dielectrophoretic Trapping—AC dielectrophoresis is an electrokinetic phenomenon where a non-uniform electric field is applied to impart a force on a polarizable particle suspended in a solution. Depending on the solution and particle conductivity, the force applied can direct the particle to be captured towards the region of high electric field strengths (positive DEP, i.e., when particle conductivity is higher than medium conductivity) or away from it (negative DEP, i.e., when particle conductivity is lower than medium conductivity). Equation 1 describes the several factors that affect the magnitude and direction of this force on a polarizable particle.

$$F_{DEP} = \pi a^3 \varepsilon_m \mathrm{Re}\left[\frac{\varepsilon_{p*} - \varepsilon_{m*}}{\varepsilon_p + 2\varepsilon_m}\right] \nabla |E_{RMS}|^2 \qquad \text{Eq. (1)}$$

Where a is particle radius, $\varepsilon_m$ is the dielectric permittivity of the surrounding medium, $$\overset{*}{\phantom{x}}\quad\overset{*}{\phantom{x}}$$

$$\left[\frac{\varepsilon_{p*} - \varepsilon_{m*}}{\varepsilon_p + 2\varepsilon_m}\right]$$

is the Clausius-Mossoti factor which defines the effective polarizability of the particle, $\Delta|E_{Rms}|$ is the electric field gradient that is dependent on the applied voltage and shape of nanoelectrodes.

In certain applications, positive DEP was used to capture a single dumbbell molecule between a pair of nanoelectrodes. FIG. 2, represented above, illustrates an exemplary concept for dielectrophoretic trapping of a dumbbell on a pair of nanoelectrodes according to some of the disclosed principles. Referring again to FIG. 2, the trapping circuit consists of AC frequency generator 216 and a dielectrophoretic chip having nanoelectrodes that are separated by 15-20 nm gap. The chip may be part of an array of 8-16384 pairs of planar nanoelectrodes that are separated by 15-20 nm gap.

To carry out the trapping, the dumbbell solution was diluted 1:10 in ultrapure water to lower the salt concentration (0.2 mM sodium citrate and 0.5 mM SDS) and solution conductivity. Chips were cleaned serially with acetone, isopropanol and water to remove organic contaminants. The chips were then placed in a UVO chamber for 5 minutes to further remove any contaminants and to improve surface wettability. A chip was then transferred to a custom chip holder that connected to the contact pads on the chip via pogo pins. The custom chip holder was also connected to a motherboard that applied the trapping signal. Trapping conditions of 100 kHz-10 MHz and 1.6 V-5 V peak-to-peak applied voltage were found to be optimal for trapping of single molecules. The signal was applied for 60-120 seconds after which the chip was dried off with $N_2$ gas and mounted on SEM stubs using carbon tape.

Figure 11:
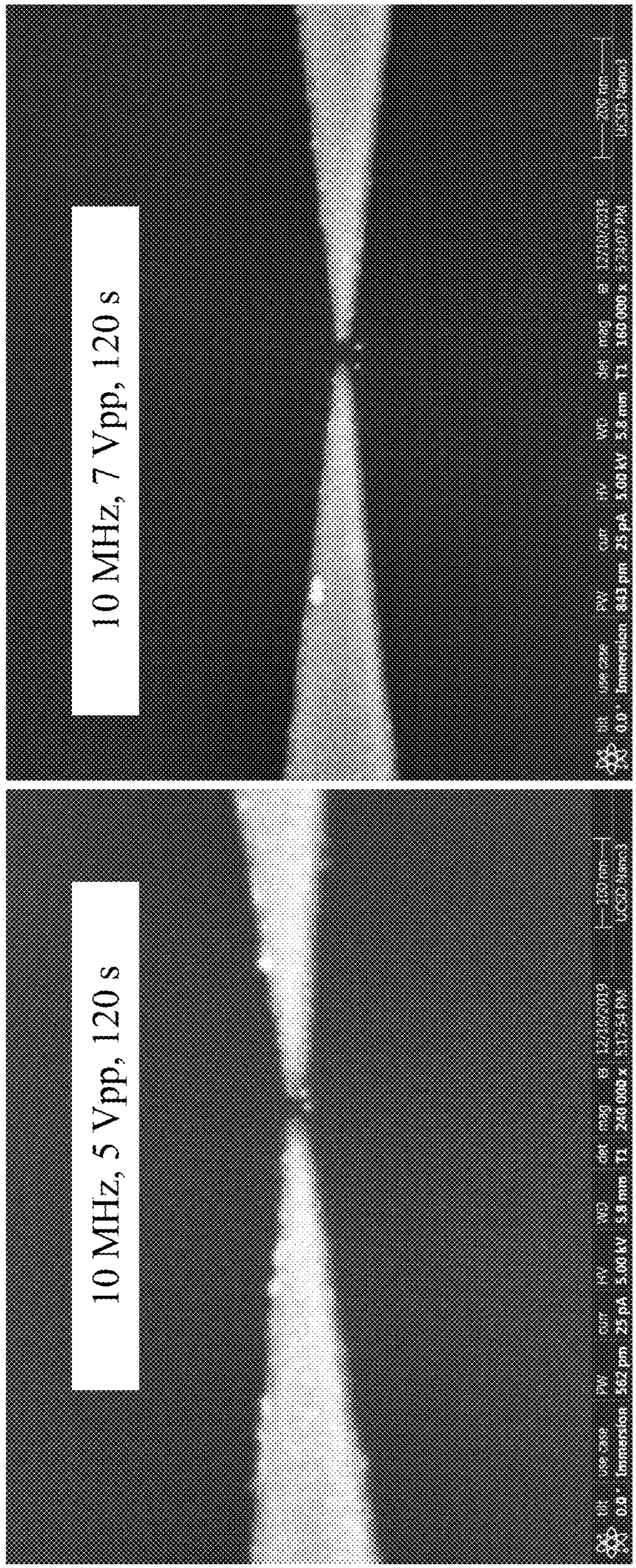
FIG. 11 shows SEM images of a 10-25-10 nm dumbbell molecule captured between a pair of nanoelectrodes.

Experimental Results—Trapping Validation—Images from trapping experiments are shown in FIG. 11 where a 45 nm dumbbell molecule (10 nm AuNPs×2, 25 nm DNA) can be observed between the nanoelectrodes. In the image on the left (10 MHz, 5 Vpp, 120 s), the trapping was carried out at 10 MHz, 5 Vpp for 2 minutes whereas in the image on the right (10 MHz, 7 Vpp, 120 s), the applied voltage was increased to 7 Vpp. In both the images, the space between the nanoelectrode and nanoparticle could be attributed to particle drifting that may have occurred while drying the chip.

Conductivity measurements—In some cases, conductivity measurements were carried out after trapping the dumbbell molecules. A constant DC bias of 1V was applied before trapping and a baseline signal was recorded for an open circuit. The trapping signal was applied for a given duration after which a constant DC bias of 1V was applied for a second time. A second current reading was taken to record any changes in the resistance between the gap from a dumbbell.

Figure 12:
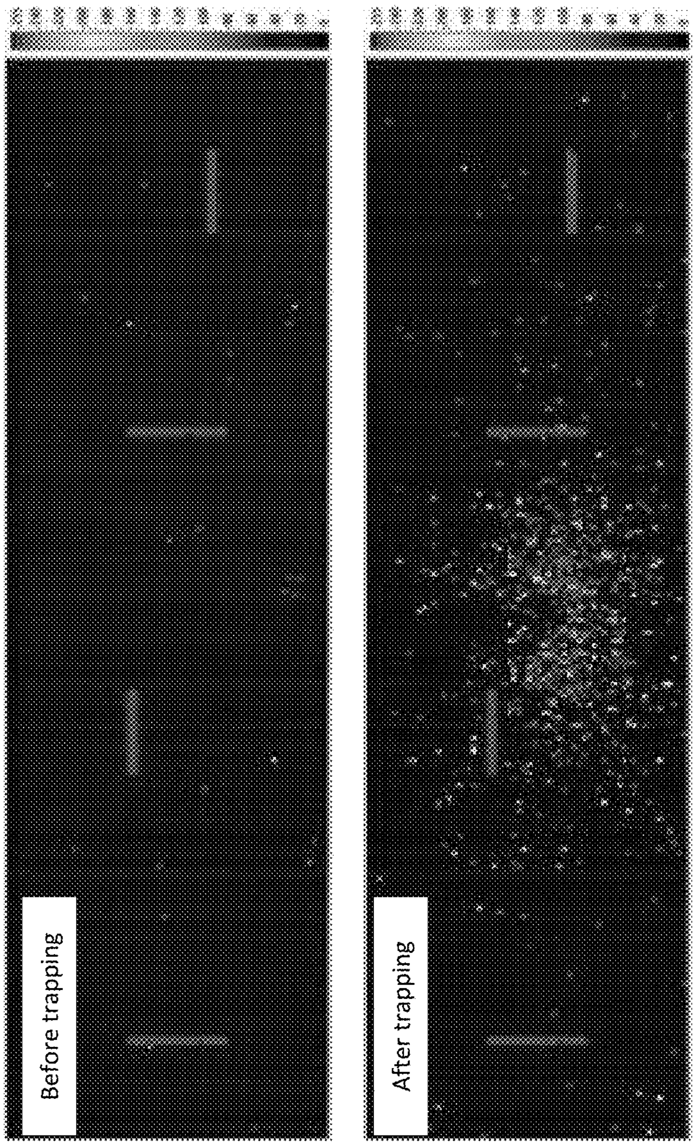
FIG. 12 shows a real-time heatmap displaying current readings on the y-axis in ADC counts. The red dashes are control sensors on the CMOS chip with fused nanoelectrodes. Top: current reading prior to trapping, bottom: current reading after trapping.
Figure 13:
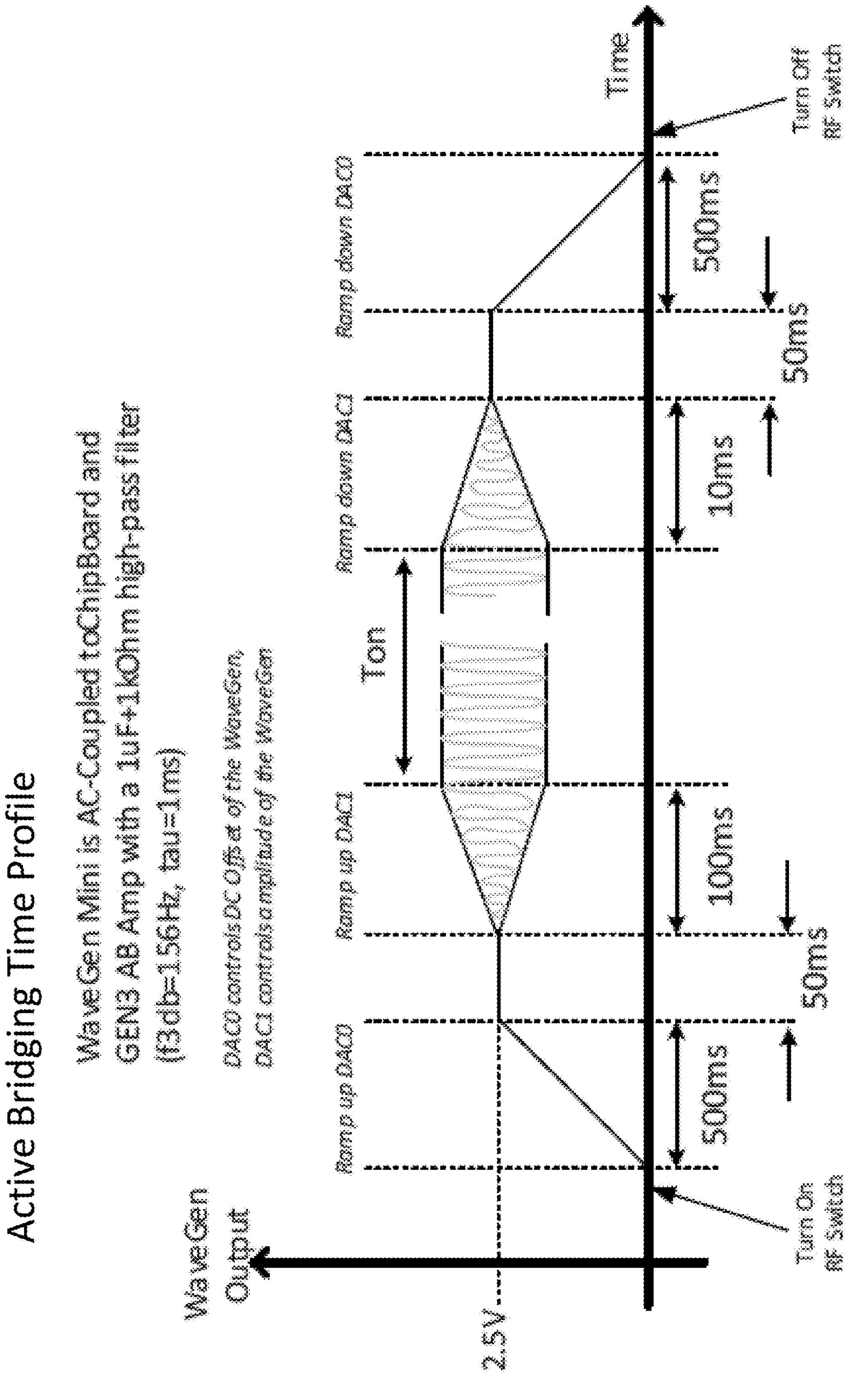
FIG. 13 shows Dielectrophoretic Driven Trapping of Au Nanoparticles where gold (AU) beads (20 nm) were added to a chip under development at an AC frequency for 5 min at 7 $V_{p-p}$ amplitude. Voltage applied is shown in the left panel, and a control with no voltage is shown in the right panel.
Figure 14:
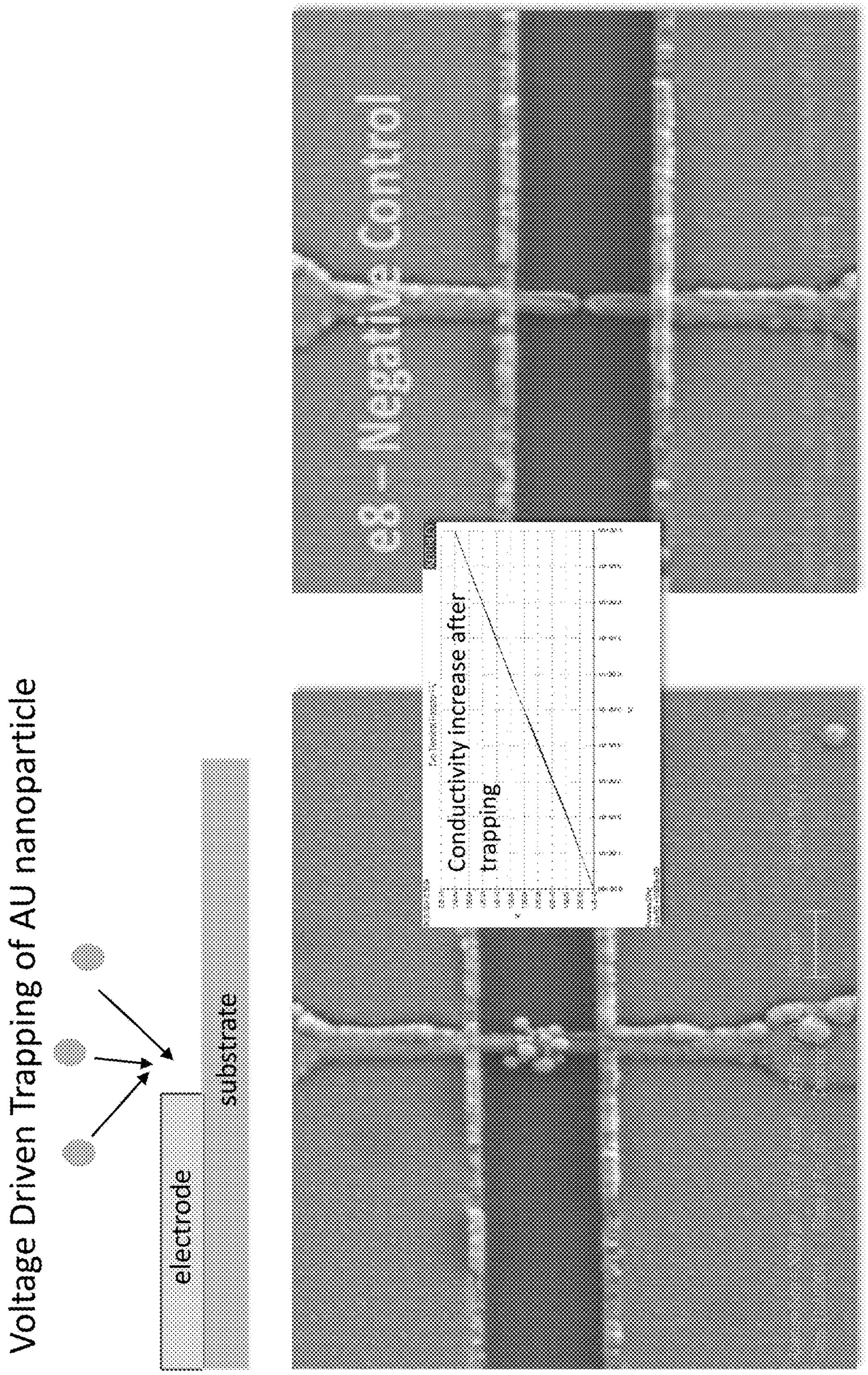
FIG. 14 shows a voltage driven assembly of dumbbell bridges.
Figure 16:
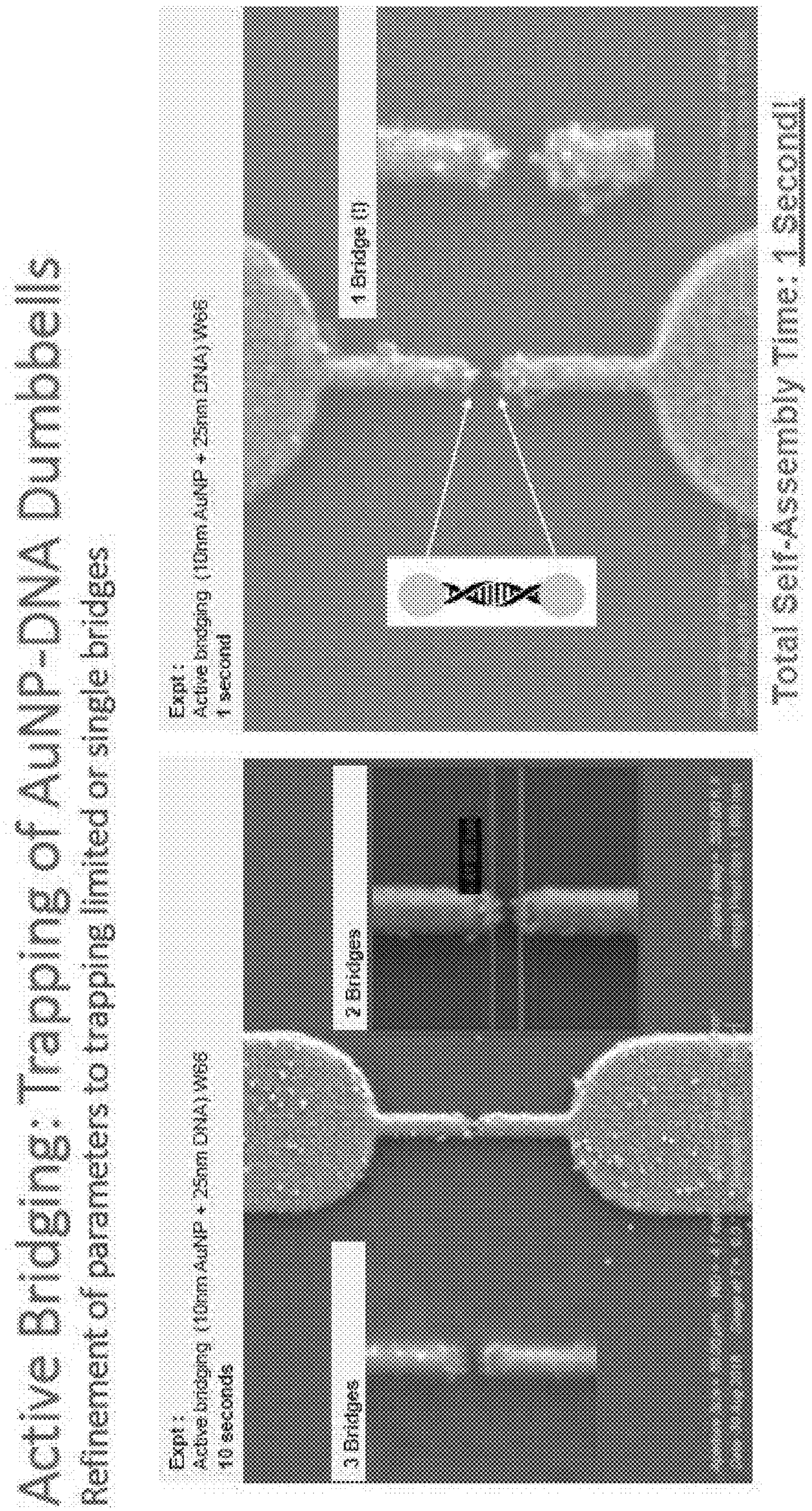
FIG. 16 illustrates DEP Field Dependent on Electrode Geometry and compares ideal and non-ideal cases, and one with parallel trapping geometry.
Figure 18:
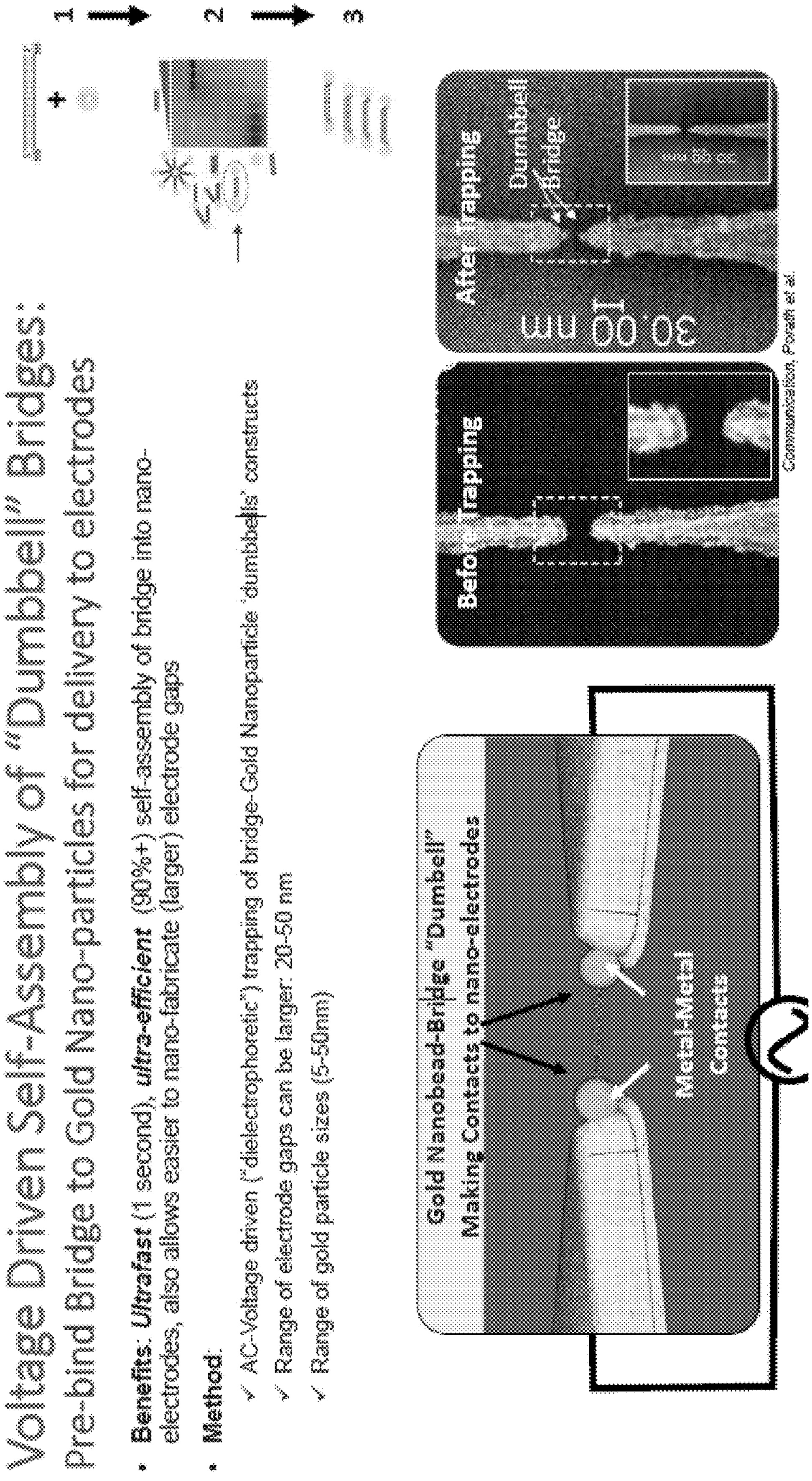
FIG. 18 shows a blunt top view of a nanoelectrode field simulation with a color coded density plot.
Figure 19:
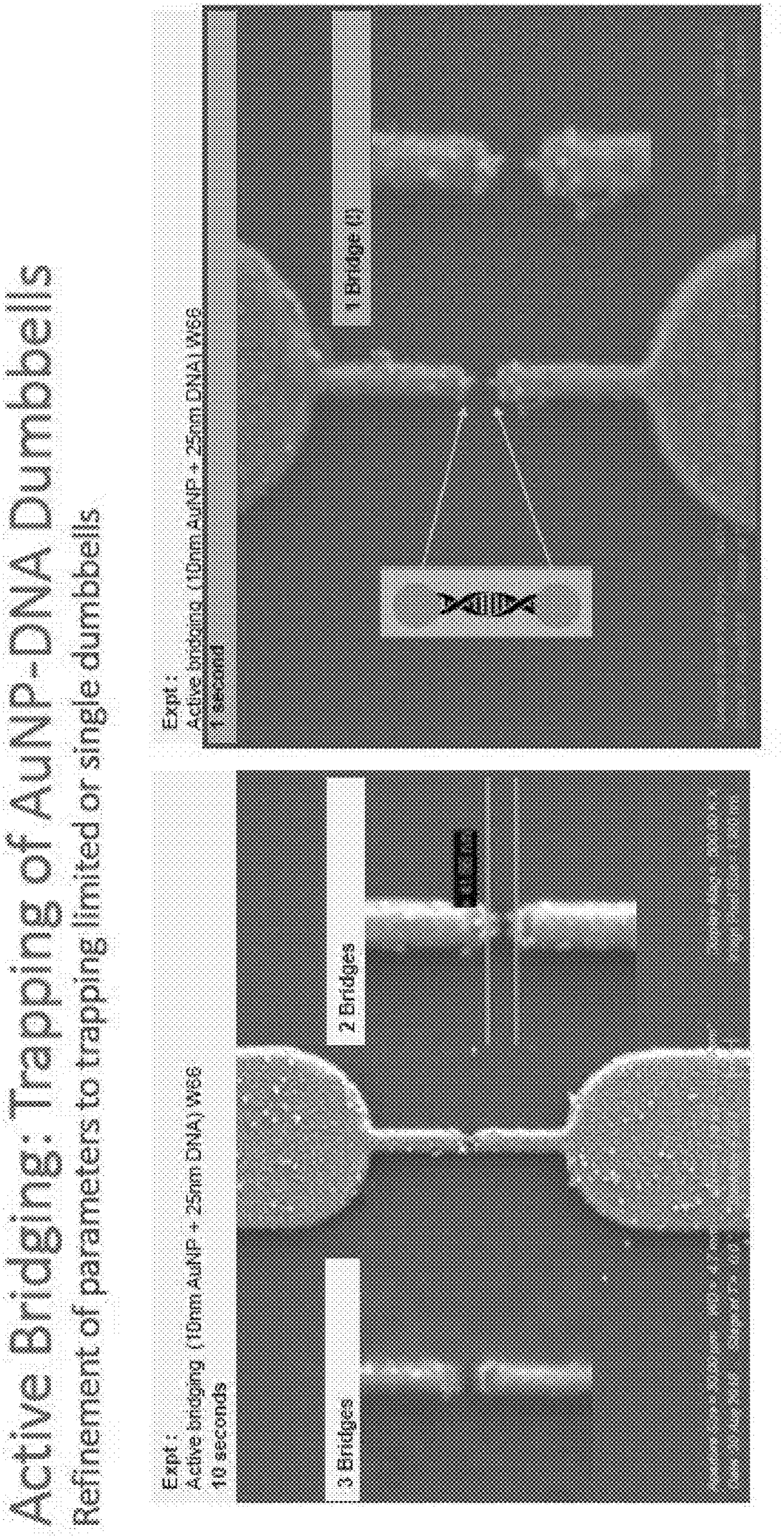
FIG. 19 shows a pointed, top view of a nanoelectrode field simulation with a color coded density plot.
Figure 20:
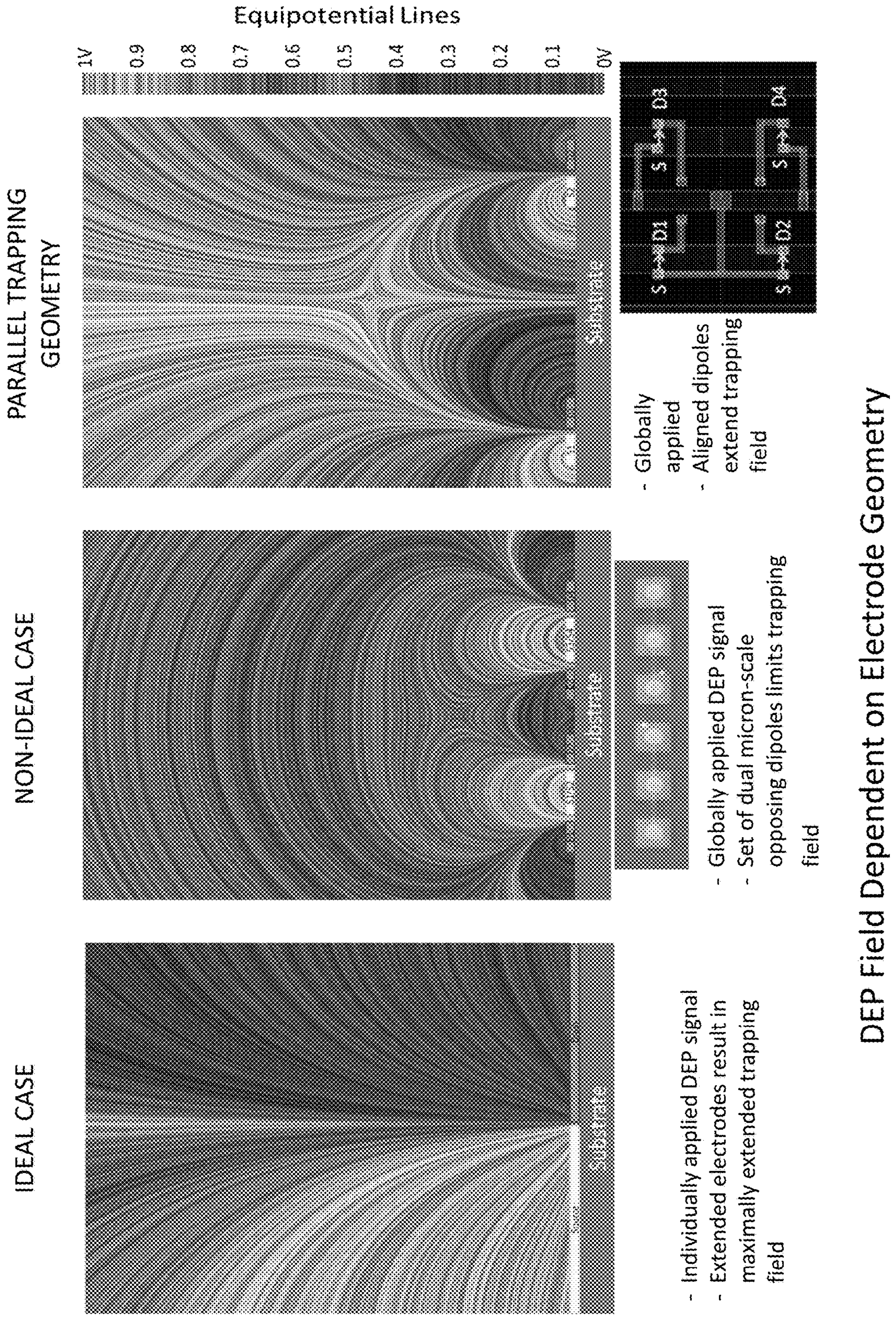
Figure 21:
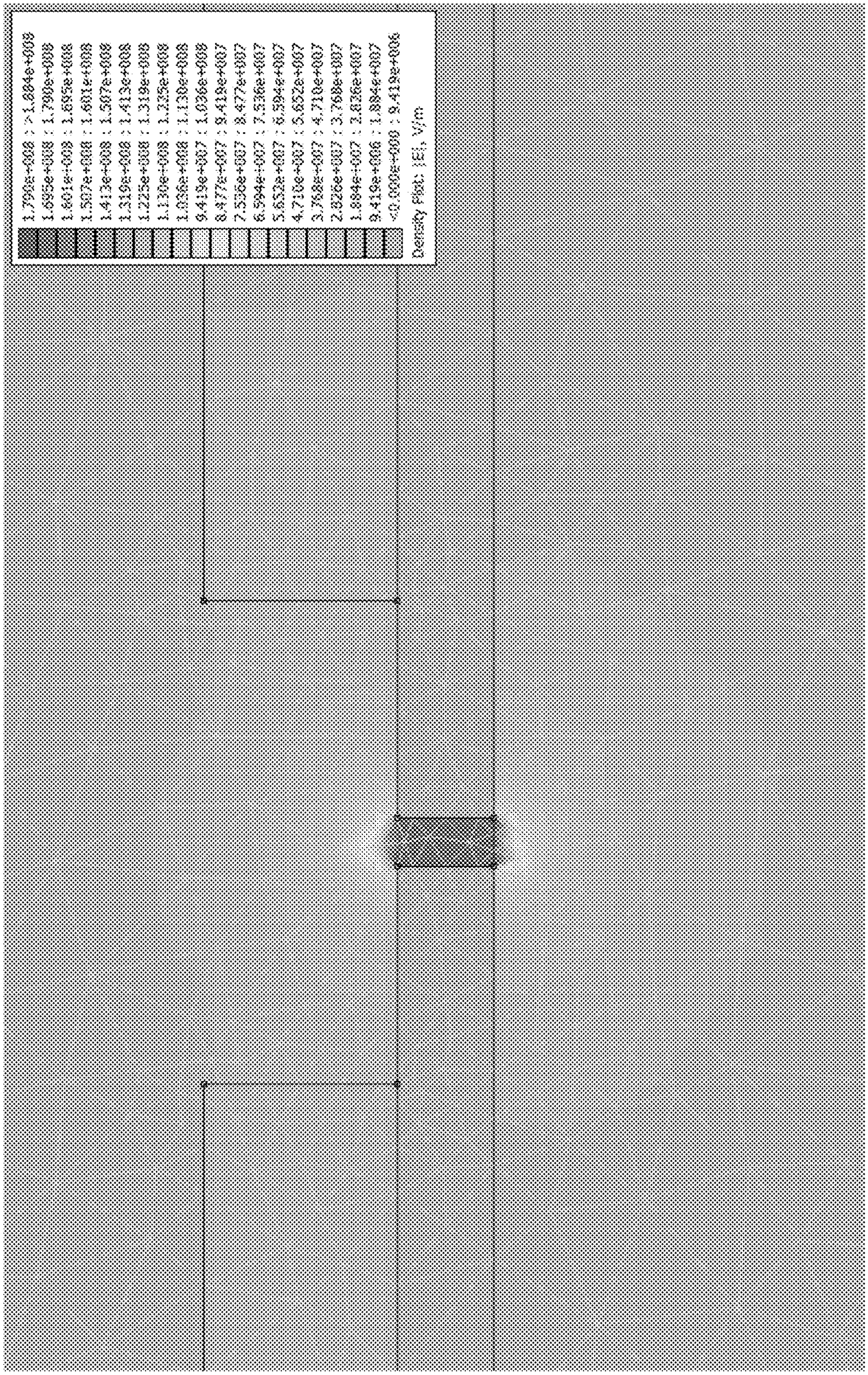
Figure 22:
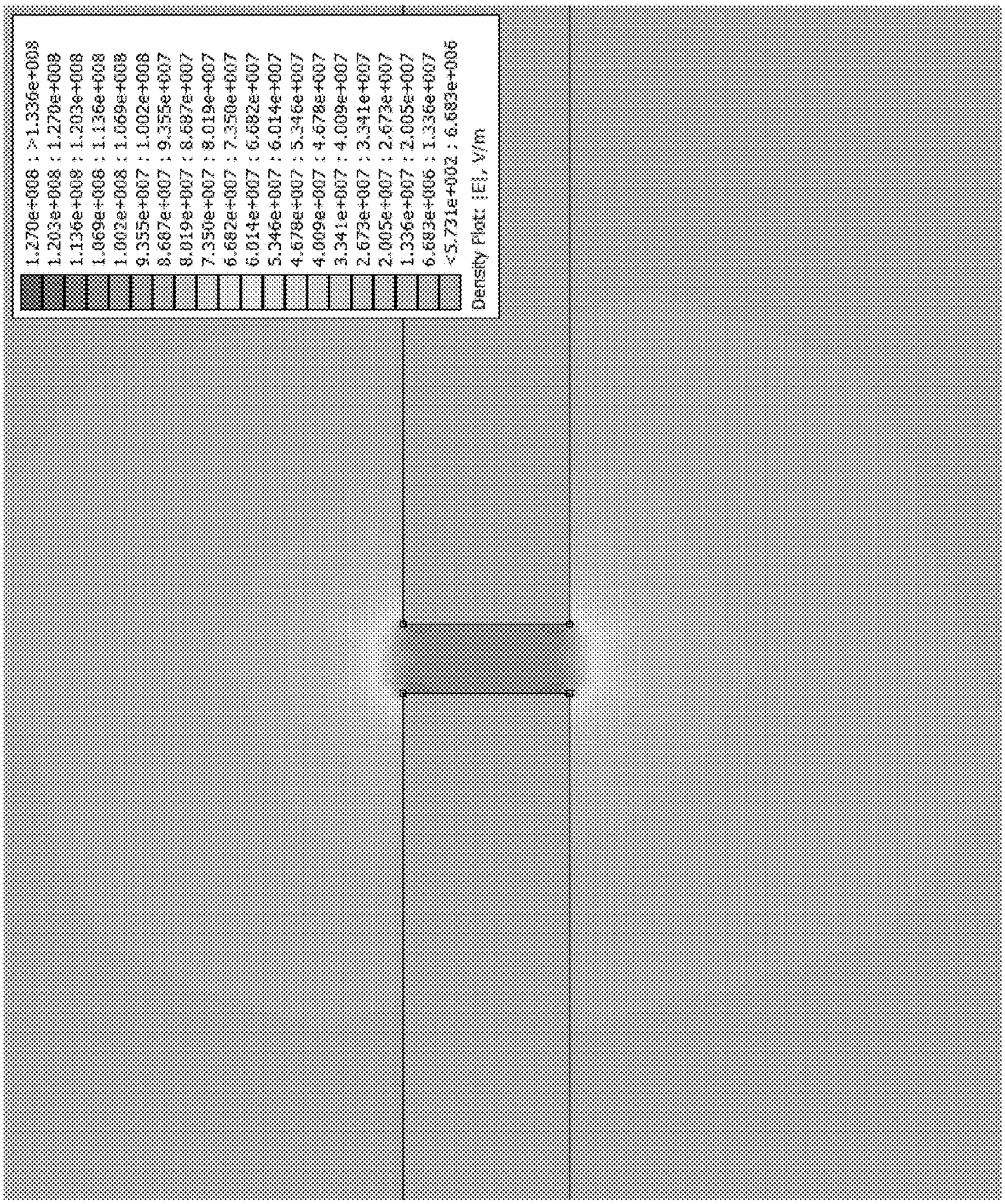
Figure 23:
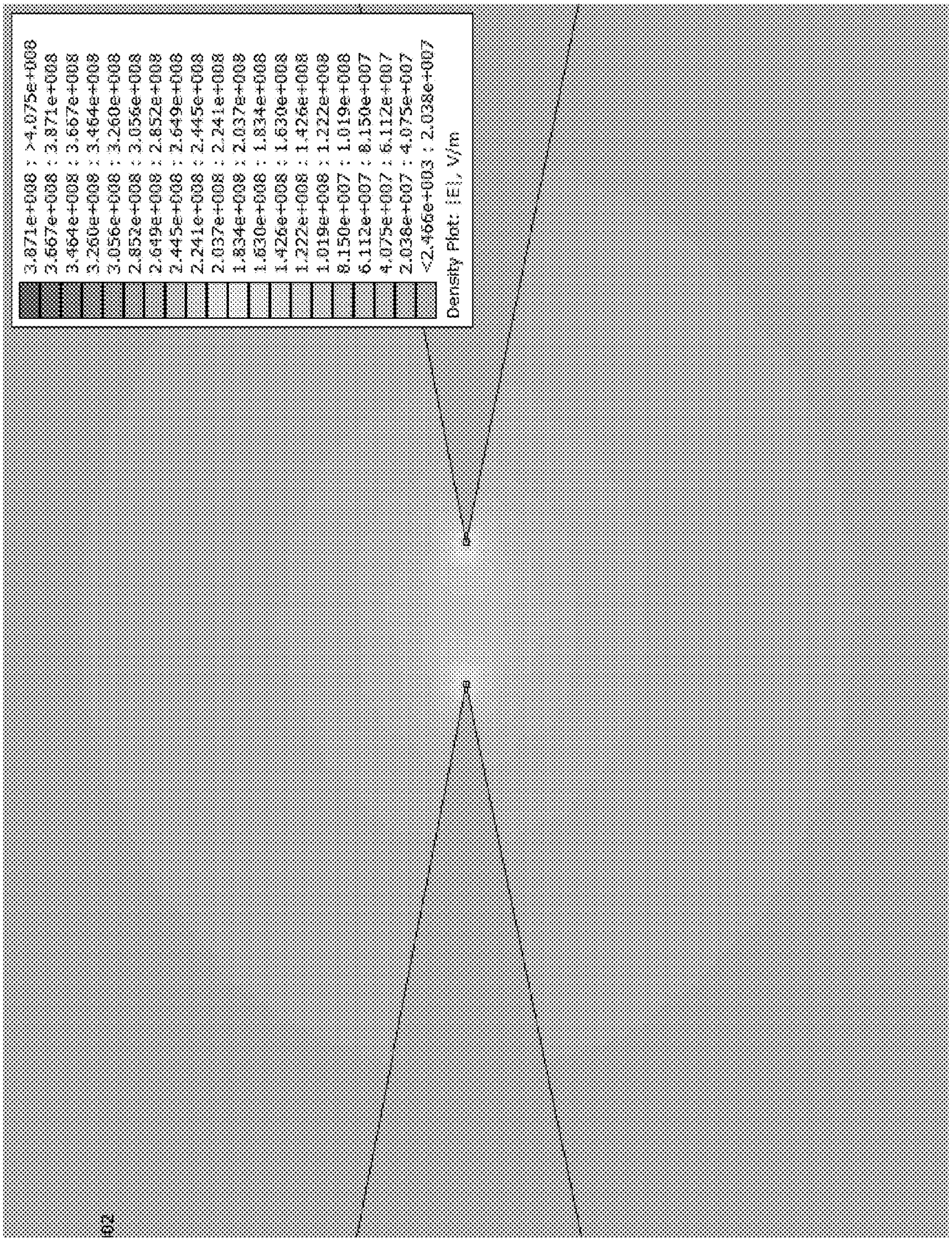
Figure 24:
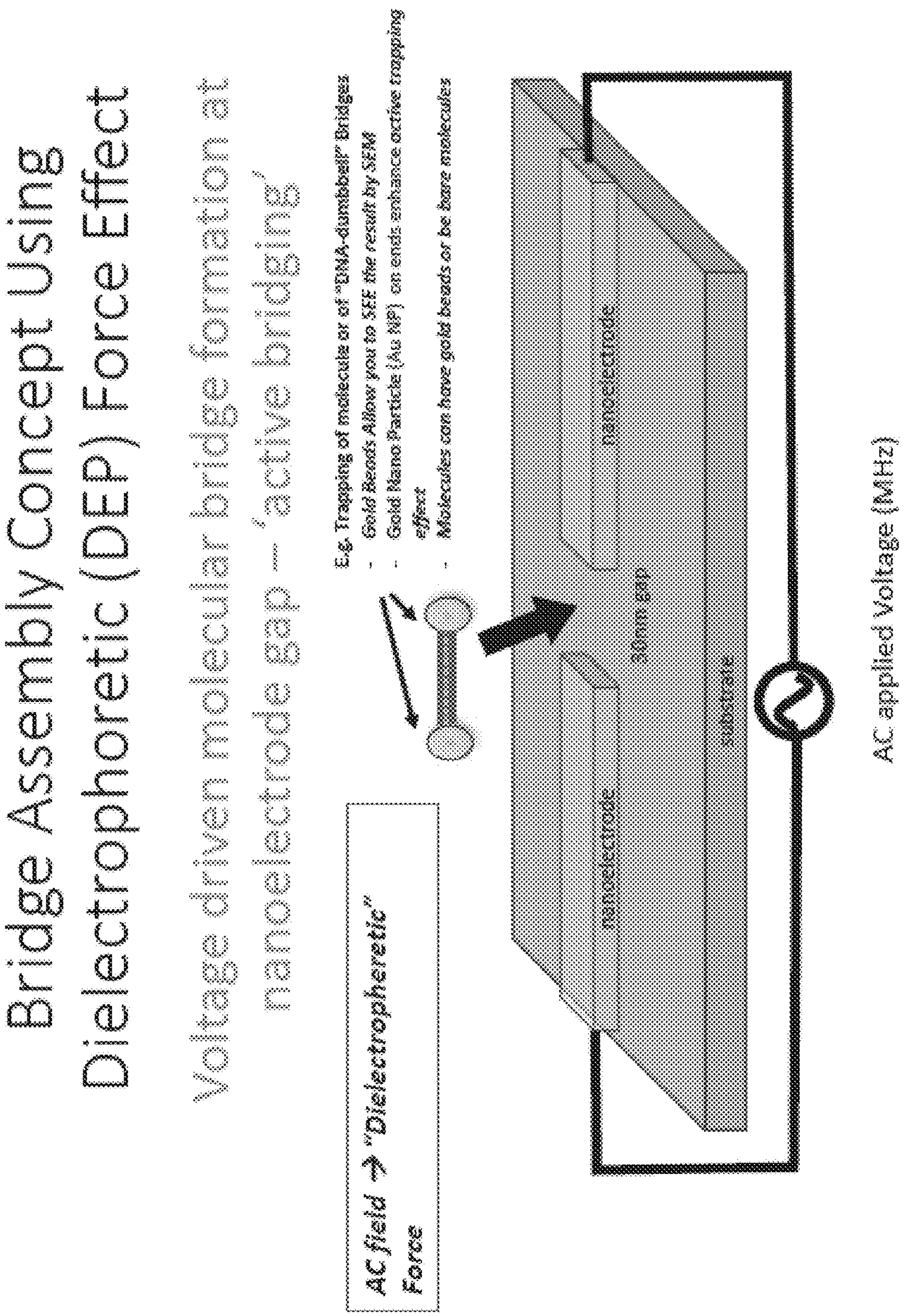
Figure 27:
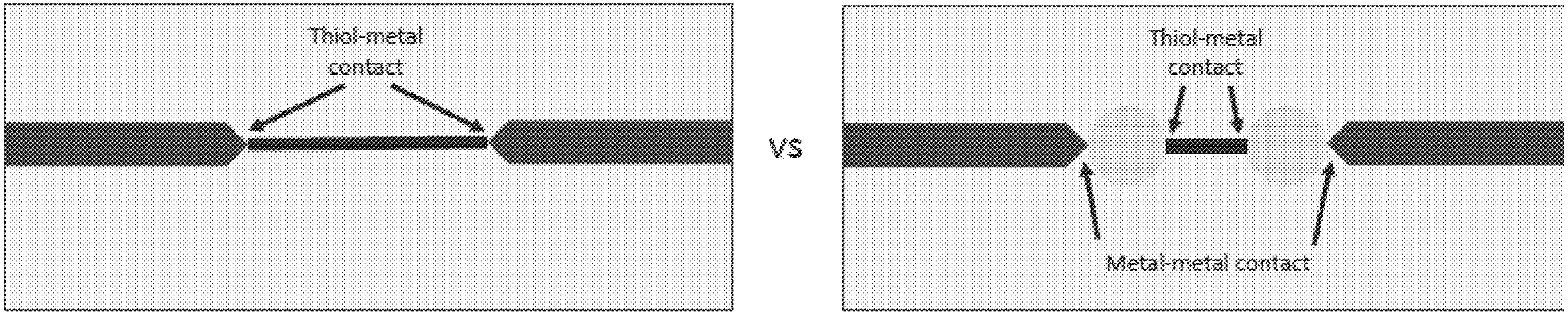
Figure 28:
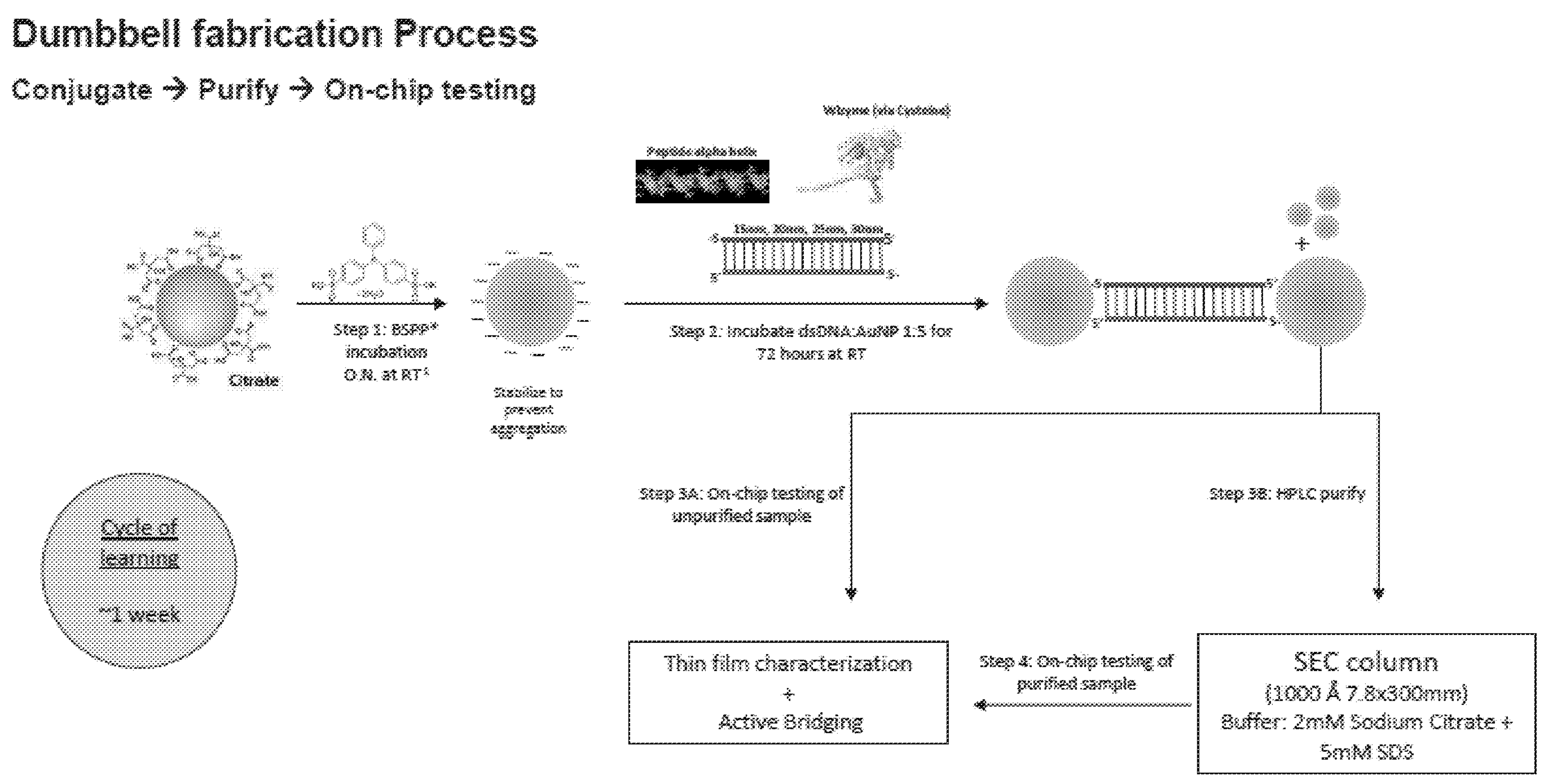
Figure 29:
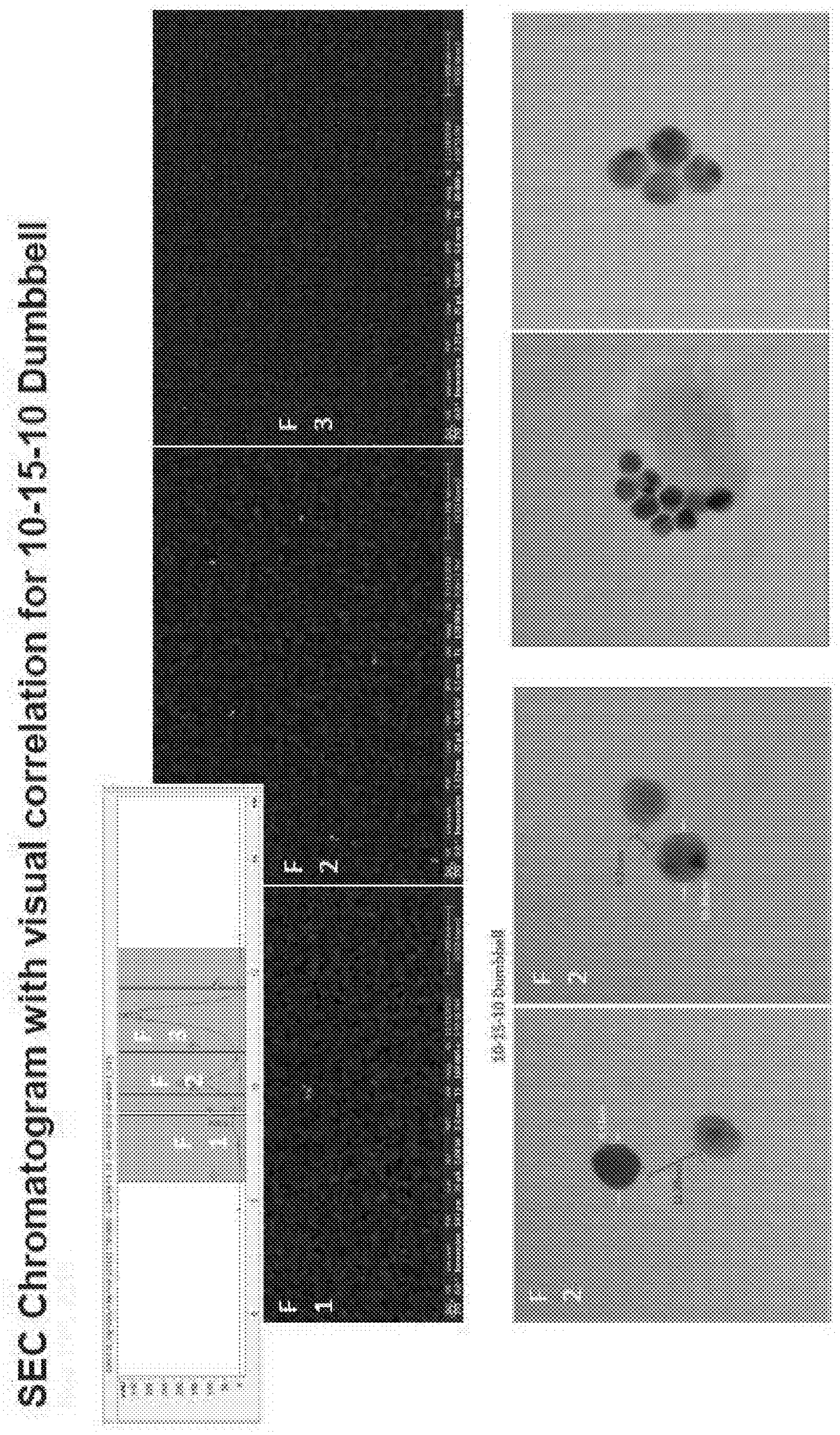
Figure 30:
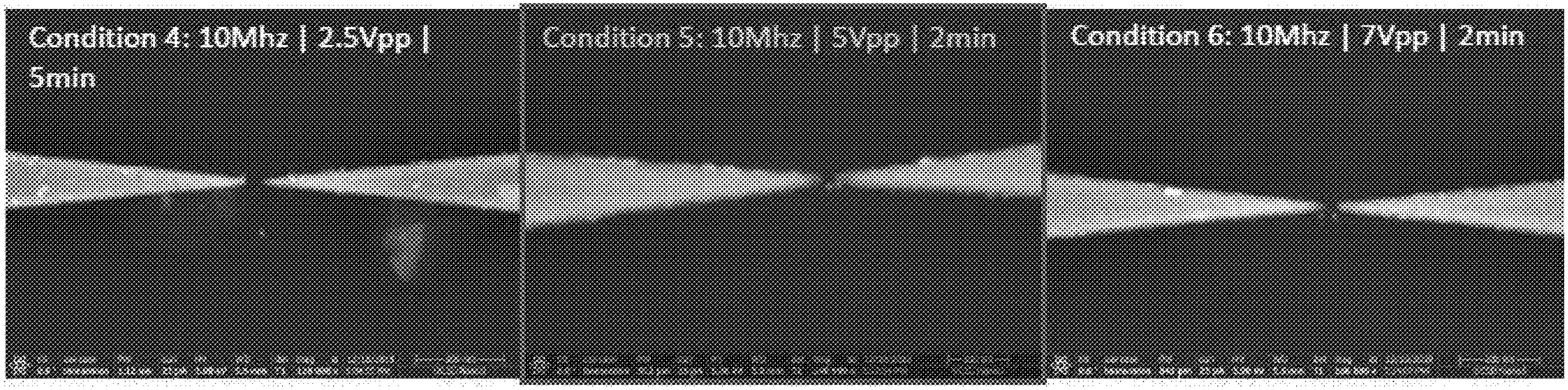
Figure 31:
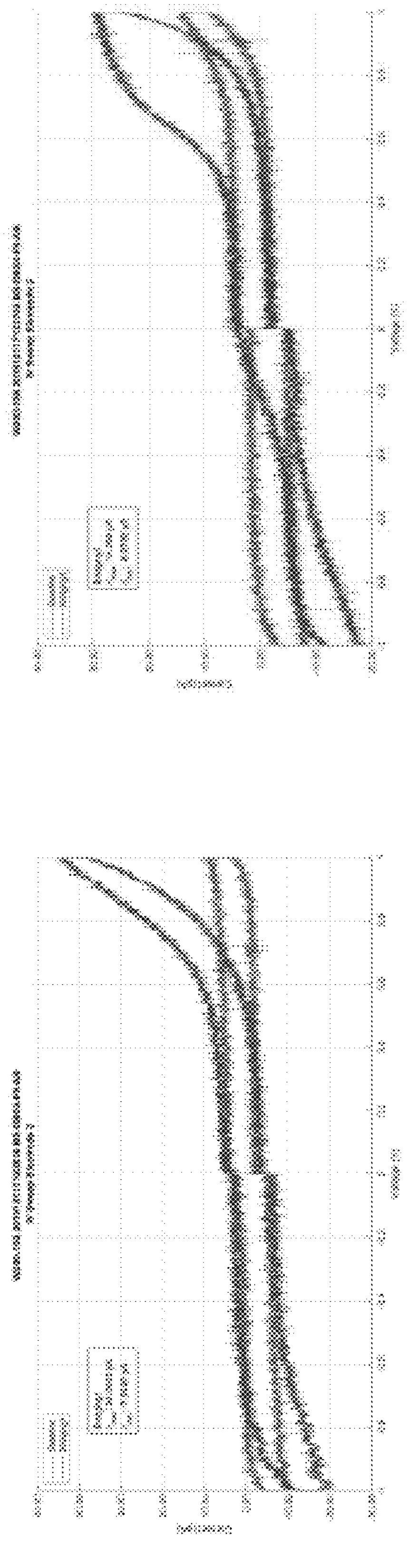
Figure 32:
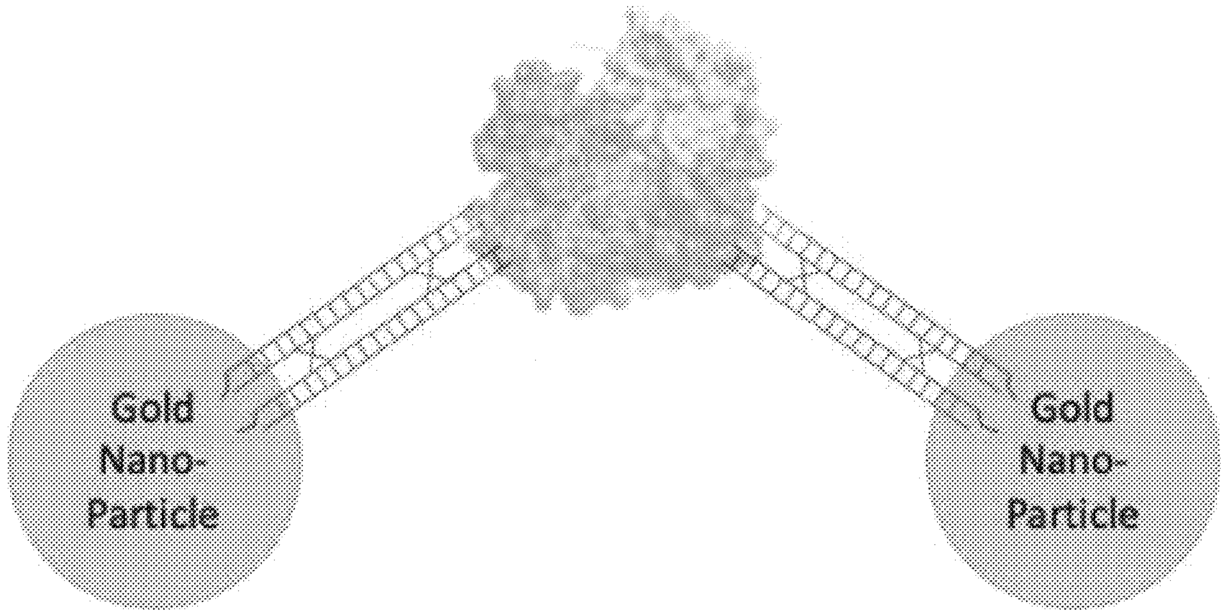
Figure 33:
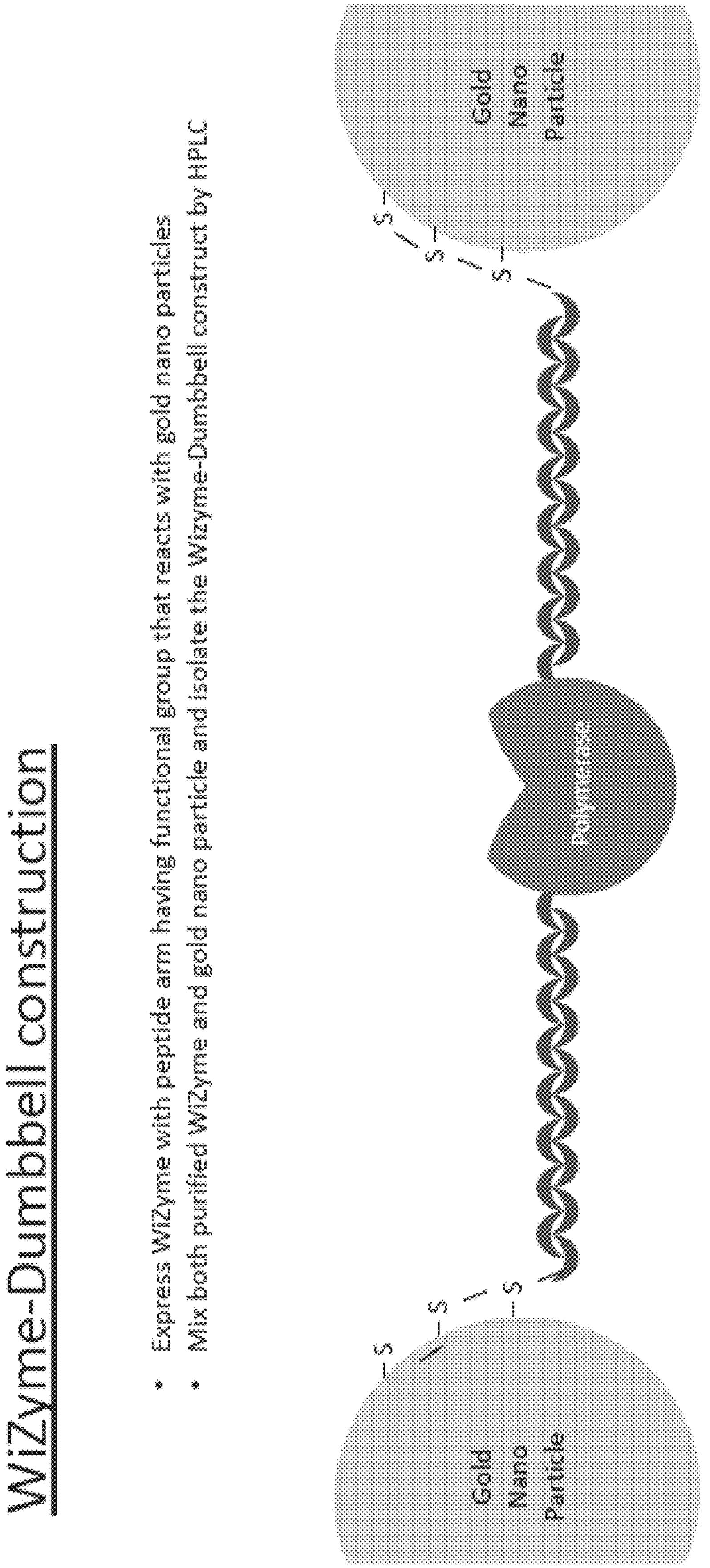

FIG. 12 displays screenshots of a sparkle chart from a 16384 sensor CMOS chip showing real time current readings before and after trapping. As can be seen from the bottom figure (recorded post trapping), there are several pixels in the central region of the chip that display a higher current reading than before trapping.

Nanoelectrode geometry can be used to enhance trapping and bridging of biomolecules to conductive nanoelectrodes by shaping and focusing the trapping field for parallel trapping events across an array of electrodes.

Dielectrophoretic trapping or bridging of biomolecules and nanoparticles across an array of nanoelectrodes is enhanced by aligning the field direction of all simultaneously trapping electrodes, maximizing the spacing between electrodes, and focusing the trapping field by tapering the electrodes to a tip.

Active trapping/bridging of nanaoparticles and/or biomolecules in a gap formed between nanoelectrodes is improved by an active bridging waveform which avoids sudden transitions between states.

Sudden changes in bias potential have a disruptive effect on the dielectrophoretic active bridging or trapping of nanoparticles and/or biomolecules. A waveform which introduces gradual ramping of both offset voltages and envelope ramp of peak to peak AC voltage improves efficiency of trapping and bridging by avoiding sudden state changes. Efficient trapping has been demonstrated with assembly time of as little as one second.

Molecules can be polarized in an applied nonhomogeneous AC electric field with optimized trapping condition. This method enables biofunctionalization of a sensor nanofabricated in a semiconductor process with spatial precision at the nano-electrode gap. The efficiency of bridging can be optimized by modulating the applied voltage, applied frequency and time. This method, within minutes, delivers consistent bridging/biofunctionalization yield across a chips with thousands of sensors.

Dumbbell bridge nano structures are formed by covalently linking two nanoparticles at the termini of a linear bridge molecule (e.g. DNA, peptide, etc.). Compared to a bare bridge molecule, a dumbbelled-molecule will yield better conduction path and defined structural placement between source and drain of a sensor. We additionally provide various ways to prepare, purify dumbbells with different bridging molecules, including for example:

1) The bridge molecules (DNA, Peptide, WiZyme and Dumbbell) can be actively placed across the source and drain of a sensor by applying AC electric field;
2) Optimal frequency for trapping is found to be between 10 kHz to 1 MHz;
3) Bridging was observed within 30 seconds of AC voltage application on a surface cleaned sensor chip;
4) Optimal stoichiometry to prepare the dumbbell with DNA, which can easily be substituted with peptide bridge molecules or molecules derived from immobilized DNA junctions;
5) Protocol to purify the dumbbell construct by High Performance Liquid Chromatography (HPLC) technique instead of conventional gel-elution method; and
6) Concept of WiZyme-Dumbbell complex for sensor functionalization.

The following exemplary embodiments are provided to further illustrate applications of the disclosed principles. The exemplary embodiments are illustrative and non-limiting. Example 1 is directed to a method to manufacture single molecule dumbbell nanowires for forming conductive molecular bridges, the method comprising: forming a double-stranded nucleic acid with terminal 3' thiol modification on both the strands conjugated to a gold (Au) nanoparticle (AuNP) on each end; purifying single biomolecule dumbbells from aggregates using size-exclusion chromatography; imaging the eluted products by electron microscopy to validate formation of single molecule dumbbells; trapping a single molecule dumbbell between a pair of nanoelectrodes on a substrate, the electrodes separated by a nanogap; and measuring the conductivity of a trapped single molecule dumbbell.

Example 2 is directed to a method of manufacturing single molecule dumbbell nanowires for forming conductive molecular bridges, said method comprising: a single stranded nucleic acid with terminal 5' and 3' thiol modifications conjugated to a AuNP; purifying single stranded nucleic acid-nanoparticle complexes from aggregates using size-exclusion chromatography; and conjugating the eluted products with a complementary strand to form a double stranded nucleic acid-nanoparticle complex.

Example 3 is directed to a method of manufacturing single molecule dumbbell nanowires for forming conductive molecular bridges, said method comprising: two complementary single stranded nucleic acids with terminal 3' thiol modification conjugated separately with an AuNP; forming double-stranded nucleic acid-nanoparticle complexes by conjugating the complementary strands; and purifying single stranded nucleic acid-nanoparticle complexes from aggregates using size-exclusion chromatography.

Example 4 is directed to a method of manufacturing single molecule dumbbell nanowires for forming conductive molecular bridges, said method comprising: a forward single stranded nucleic acid with a terminal 3' thiol modification conjugated to an AuNP; purifying the forward strand nucleic acid-nanoparticle complex from aggregates using size-exclusion chromatography; a reverse strand with a terminal 3' thiol modification conjugated to an AuNP; purifying the reverse strand nucleic acid-nanoparticle complex from aggregates using size-exclusion chromatography; conjugating the purified forward and reverse nucleic acid-nanoparticle complexes to form a double stranded nucleic acid-nanoparticle complex;

Example 5 is directed to dumbbell bridges such as those discussed in relation to Examples 1-4 above which a probe molecule.

Example 6 is directed to the use of dumbbell bridges such as above, for sensor applications, including DNA hybridization detection via a DNA oligo probe, or DNA sequencing via a polymerase probe.

Example 7 is directed to a CMOS chip sensor array formed by having such dumbbell bridges integrated into nanoelectrodes in the measurement pixels, and the methods of use of such for hybridization assays or DNA sequencing assays, and other molecular detection assays.

Example 8 is directed to dumbbells compositions and methods of manufacturing and use, where the particles are metal nanoparticles, and the bridges are double-stranded DNA or alpha-helical peptides, possible comprising a probe molecule attached to the bridge, or a conjugation site for later attachment of such, or enzymes with two such arm attached for connection to the particles.

Example 9 is directed to formation of dumbbell circuits by dielectrophoretic trapping, and possibly also with termination of the trapping field upon detection of a closed circuit, so as to tarp just a single dumbbell bridge between the nanoelectrodes.

Example 10 is directed to a molecular complex configured to bridge a nanogap between a complementary pair of electrodes, the molecular complex comprising: a biomolecule having first end and a second end, wherein at least one of the first end or the second ends of the biomolecule comprises a terminal 3' thiol modification; a first nanoparticle to couple with the first end of the biomolecule; a second nanoparticle to couple with the second end of the biomolecule; and the first end of the biomolecule is conjugated to the first nanoparticle and the second end of the biomolecule is conjugated to the second nanoparticle.

Example 11 is directed to the molecular complex of example 10, wherein the biomolecule comprises a double stranded nucleic acid (dsDNA) having a thiolated end and wherein the first nanoparticle couples to the biomolecule through the thiolated end of the biomolecule.

Example 12 is directed to the molecular complex of example 10, wherein the biomolecule comprises one of a single strand or a double-stranded nucleic acid.

Example 13 is directed to the molecular complex of example 10, wherein the molecular complex is conductive.

Example 14 is directed to the molecular complex of example 10, wherein the first and the second nanoparticles are stabilized to prevent nanoparticle aggregation.

Example 15 is directed to a method for making a molecular complex configured to bridge a nanogap between a complementary pair of electrodes, the method comprising: forming a nucleic acid [ssDNA and dsDNA] having a first and a second functionalized ends; forming a plurality of nanoparticles, the plurality of nanoparticles comprising a first nanoparticle and a second nanoparticle; conjugating the first functionalized end of the nucleic acid with the first nanoparticle; and conjugating the second functionalized end of the nucleic acid with the second nanoparticle; wherein the nucleic acid comprises two complementary single stranded nucleic acids with terminal 3' thiol modification to conjugate separately with each of the first and the second nanoparticles.

Example 16 is directed to the method of example 15, wherein the nucleic acid comprises a single strand DNA (ssDNA) or a double strand DNA (dsDNA).

Example 17 is directed to the method of example 16, wherein the nanoparticle is selected from the group consisting of gold, platinum, palladium, silver, silica, carbon nanospheres.

Example 18 is directed to the method of example 17, further comprising coupling the first nanoparticle to a first nanoelectrode via a surface ligand and wherein the surface ligands is selected from the group consisting of citrate, amine, tannic acid, dodecanethiol, carboxyl, polyethylene glycol (PEG), Polyvinylpyrrolidone (PVP) may be capped onto the nanoparticle.

Example 19 is directed to the method of example 18, further comprising coupling the second nanoparticle to a second nanoelectrode and extending the molecular complex to substantially bridge a nanogap between the first and the second nanoelectrodes.

Example 20 is directed to the method of example 16, further comprising purifying plurality of nanoparticles by incubating a plurality of raw nanoparticles comprising incubating at least two nanoparticle with a citrate compound on the surface thereof with bis(p-sulfonatophenyl)phenylphosphine dihydrate dipotassium salt (BSPP) for a period of about 8 hours to substantially stabilize the citrate compound and combining the stabilized first and second nanoparticles with thiolated double stranded DNA (dsDNA).

Example 21 is directed to a molecular sensor array, comprising: a plurality of sensors, at least one sensor having: a first nanoelectrode and a second nanoelectrode, the first and the second nanoelectrodes separated by a gap, the first nanoelectrode and the second nanoelectrodes forming an electrode pair; a molecular complex extended between the first nanoelectrode and the second nanoelectrode, the molecular complex further comprising: a biomolecule having first end and a second end, wherein at least one of the first end or the second ends of the biomolecule comprises a terminal 3' thiol modification; a first nanoparticle to couple with the first end of the biomolecule; a second nanoparticle to couple with the second end of the biomolecule; and the first end of the biomolecule is conjugated to the first nanoparticle and the second end of the biomolecule is conjugated to the second nanoparticle; wherein the biomolecule is functionalized with a terminal 3' thiol modification to conjugate separately with each of the first and the second nanoparticles.

Example 22 is directed to the molecular sensor array of example 21, wherein the biomolecule comprises one of a single strand or a double-stranded nucleic acid.

Example 23 is directed to the molecular complex of example 21, wherein the molecular complex is conductive.

Example 24 is directed to the molecular complex of example 21, wherein the first and the second nanoparticles are stabilized to prevent nanoparticle aggregation.

Example 25 is directed to the molecular complex of example 21, wherein the molecular complex defines a length substantially equal to the gap and wherein the length is selected from the group consisting of 10-15 nm, 15-25 nm, 25-35 nm, 35-45 nm, 45-100 nm, 100 nm-500 nm, 500 nm-1 μm.

Example 26 is directed to the molecular complex of example 21, further comprising a passivation layer supporting the nanoelectrodes and a substrate to support the passivation layer.

Example 27 is directed to the molecular complex of example 21, further comprising an induction source to induce positioning of the molecular complex substantially in the gap.

Example 28 is directed to a biomolecule of any prior example wherein the biomolecule comprises at least 98% identity, at least 95% identity, at least 90% identity to sequences, or at least 85% identity (and SEQ ID NO) identified at FIG. 3.

While the principles of the disclosure have been illustrated in relation to the exemplary embodiments shown herein, the principles of the disclosure are not limited thereto and include any modification, variation or permutation thereof.

What is claimed is:

1. A molecular complex configured to bridge a nanogap between a complementary pair of electrodes, the molecular complex comprising:

a biomolecule having first end and a second end, wherein at least one of the first end or the second ends of the biomolecule comprises a terminal 3' thiol modification;

a first nanoparticle to couple with the first end of the biomolecule and a second nanoparticle to couple with the second end of the biomolecule to form the molecular complex; and wherein the nanoparticles include a stabilized compound resulting from a reaction of a citrate compound on the surface of the nanoparticle with bis(p-sulfonatophenyl) phenylphosphine dihydrate dipotassium salt (BSPP);

wherein the molecular complex is configured to freely suspend in the nanogap through an electrostatic force between the molecular complex and the pair of electrodes.

2. The molecular complex of claim 1, wherein the biomolecule comprises a double stranded nucleic acid (dsDNA) having a thiolated end and wherein the first nanoparticle couples to the biomolecule through the thiolated end of the biomolecule.

3. The molecular complex of claim 1, wherein the biomolecule comprises one of a single strand or a double-stranded nucleic acid.

4. The molecular complex of claim 1, wherein the molecular complex is conductive.

5. The molecular complex of claim 1, wherein the first and the second nanoparticles are stabilized to prevent nanoparticle aggregation.

6. A method for making a molecular complex configured to bridge a nanogap between a complementary pair of electrodes, the method comprising:

forming a nucleic acid having a first and a second functionalized ends;

forming a plurality of nanoparticles, the plurality of nanoparticles comprising a first nanoparticle and a second nanoparticle;

conjugating the first functionalized end of the nucleic acid with the first nanoparticle; and conjugating the second functionalized end of the nucleic acid with the second nanoparticle;

wherein the nucleic acid comprises two complementary single stranded nucleic acids with terminal 3' thiol modification to conjugate separately with each of the first and the second nanoparticles; and wherein the nanoparticles include a stabilized compound resulting from a reaction of a citrate compound on the surface of the nanoparticle with bis(p-sulfonatophenyl) phenylphosphine dihydrate dipotassium salt (BSPP); and wherein the molecular complex is configured to freely suspend in the nanogap through an electrostatic force between the molecular complex and the pair of electrodes.

7. The method of claim 6, wherein the nucleic acid comprises a single strand DNA (ssDNA) or a double strand DNA (dsDNA).

8. The method of claim 6, wherein the nanoparticle is selected from the group consisting of gold, platinum, palladium, silver, silica, carbon nanospheres.

9. The method of claim 7, further comprising coupling the first nanoparticle to a first nanoelectrode via a surface ligand and wherein the surface ligands is selected from the group consisting of citrate, amine, tannic acid, dodecanethiol, carboxyl, polyethylene glycol (PEG), Polyvinylpyrrolidone (PVP) may be capped onto the nanoparticle.

10. The method of claim 9, further comprising coupling the second nanoparticle to a second nanoelectrode and extending the molecular complex to substantially bridge a nanogap between the first and the second nanoelectrodes.

11. The method of claim 6, further comprising purifying plurality of nanoparticles by incubating a plurality of raw nanoparticles comprising incubating at least two nanoparticle with the BSPP for a period of about 8 hours to substantially stabilize the citrate compound and combining the stabilized first and second nanoparticles with thiolated double stranded DNA (dsDNA).

12. A molecular sensor array, comprising:

a plurality of sensors, at least one sensor having:

a first nanoelectrode and a second nanoelectrode, the first and the second nanoelectrodes separated by a nanogap, the first nanoelectrode and the second nanoelectrodes forming an electrode pair;

a molecular complex extended between the first nanoelectrode and the second nanoelectrode, the molecular complex further comprising:

a biomolecule having first end and a second end, wherein at least one of the first end or the second ends of the biomolecule comprises a terminal 3' thiol modification;

a first nanoparticle to couple with the first end of the biomolecule;

a second nanoparticle to couple with the second end of the biomolecule; and the first end of the biomolecule is conjugated to the first nanoparticle and the second end of the biomolecule is conjugated to the second nanoparticle;

wherein the biomolecule is functionalized with a terminal 3' thiol modification to conjugate separately with each of the first and the second nanoparticles;

wherein the molecular complex is configured to freely suspend in the nanogap between the electrode pair through an electrostatic force; and wherein the nanoparticles include a stabilized compound resulting from a reaction of a citrate compound on the surface of the nanoparticle with bis(p-sulfonatophenyl)phenylphosphine dihydrate dipotassium salt (BSPP).

13. The molecular sensor array of claim 12, wherein the biomolecule comprises one of a single strand or a double-stranded nucleic acid.

14. The molecular complex of claim 12, wherein the molecular complex is conductive.

15. The molecular complex of claim 12, wherein the first and the second nanoparticles are stabilized to prevent nanoparticle aggregation.

16. The molecular complex of claim 12, wherein the molecular complex defines a length substantially equal to the gap and wherein the length is selected from the group consisting of 10-15 nm, 15-25 nm, 25-35 nm, 35-45 nm, 45-100 nm, 100 nm-500 nm, 500 nm-1 μm.

17. The molecular complex of claim 12, further comprising a passivation layer supporting the nanoelectrodes and a substrate to support the passivation layer.

18. The molecular complex of claim 12, further comprising an induction source to induce positioning of the molecular complex substantially in the gap.

19. The molecular complex of claim 1, wherein the molecular complex is configured to be assembled in the nanogap between the complementary pair of electrodes by one of passive diffusion, DC voltage driving trapping or dielectrophoresis to freely suspend between the complementary pair of electrodes across the nanogap without attachment to any other solid surface.

20. The molecular complex of claim 1, wherein the molecular complex defines a length substantially equal to the nanogap and wherein the complementary pair of electrodes is separated by one and only one molecular complex.

* * * * *

```
                    SEQUENCE LISTING


<160> NUMBER OF SEQ ID NOS: 9

<210> SEQ ID NO 1
<211> LENGTH: 47
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1

gcgtgctcac ctctgcccgc cggagcctgc gcgactgggt cgaggcc                47


<210> SEQ ID NO 2
<211> LENGTH: 47
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2

ggcctcgacc cagtcgcgca ggctccggcg ggcagaggtg agcacgc                47


<210> SEQ ID NO 3
<211> LENGTH: 85
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (36)..(36)
<223> OTHER INFORMATION: t or modified t
<220> FEATURE:
<223> OTHER INFORMATION: See specification as filed for detailed
      description of substitutions and preferred embodiments

<400> SEQUENCE: 3

ccggtcgagc tccggtgtgc ccgacgcctg tccgcnccca gctgccgcgc agagtgcgcc     60

agctcgcagg ccgagccctc ccggc                                           85


<210> SEQ ID NO 4
<211> LENGTH: 85
<212> TYPE: DNA
<213> ORGANISM: Artificial Sequence
<220> FEATURE:
```

<223> OTHER INFORMATION: Description of Artificial Sequence: Synthetic
      oligonucleotide

<400> SEQUENCE: 4
gccgggaggg ctcggcctgc gagctggcgc actctgcgcg gcagctggga gcggacaggc     60
gtcgggcaca ccggagctcg accgg                                           85

<210> SEQ ID NO 5
<211> LENGTH: 85
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (36)..(36)
<223> OTHER INFORMATION: t or modified t
<220> FEATURE:
<223> OTHER INFORMATION: See specification as filed for detailed
      description of substitutions and preferred embodiments

<400> SEQUENCE: 5
ccggtcgagc tccggtgtgc ccgacgcctg tccgcnccca gctgccgcgc agagtgcgcc     60
agctcgcagg ccgagccctc ccggc                                           85

<210> SEQ ID NO 6
<211> LENGTH: 85
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
gccgggaggg ctcggcctgc gagctggcgc actctgcgcg gcagctggga gcggacaggc     60
gtcgggcaca ccggagctcg accgg                                           85

<210> SEQ ID NO 7
<211> LENGTH: 85
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (36)..(36)
<223> OTHER INFORMATION: t or modified t
<220> FEATURE:
<223> OTHER INFORMATION: See specification as filed for detailed
      description of substitutions and preferred embodiments

<400> SEQUENCE: 7
ccggtcgagc tccggtgtgc ccgacgcctg tccgcnccca gctgccgcgc agagtgcgcc     60
agctcgcagg ccgagccctc ccggc                                           85

<210> SEQ ID NO 8
<211> LENGTH: 47
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8

-continued

```
gcgtgctcac ctctgcccgc cggagcctgc gcgactgggt cgaggcc              47


<210> SEQ ID NO 9
<211> LENGTH: 47
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9

ggcctcgacc cagtcgcgca ggctccggcg ggcagaggtg agcacgc              47
```